US012580185B2

(12) United States Patent
Nakada et al.

(10) Patent No.: US 12,580,185 B2
(45) Date of Patent: Mar. 17, 2026

(54) NEGATIVE ELECTRODE MATERIAL, BATTERY, PRODUCTION METHOD FOR NEGATIVE ELECTRODE MATERIAL, AND MANUFACTURING METHOD FOR BATTERY

(71) Applicant: MITSUBISHI MATERIALS CORPORATION, Tokyo (JP)

(72) Inventors: Yoshinobu Nakada, Saitama (JP); Naoki Rikita, Tokyo (JP); Jie Tang, Ibaraki (JP); Kun Zhang, Ibaraki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 268 days.

(21) Appl. No.: 18/285,276

(22) PCT Filed: Mar. 18, 2022

(86) PCT No.: PCT/JP2022/012756
§ 371 (c)(1),
(2) Date: Oct. 2, 2023

(87) PCT Pub. No.: WO2022/215498
PCT Pub. Date: Oct. 13, 2022

(65) Prior Publication Data
US 2024/0113289 A1 Apr. 4, 2024

(30) Foreign Application Priority Data

Apr. 8, 2021 (JP) ................................. 2021-066079
Oct. 13, 2021 (JP) ................................. 2021-168448

(51) Int. Cl.
*H01M 4/38* (2006.01)
*H01M 4/02* (2006.01)
(Continued)

(52) U.S. Cl.
CPC ............. *H01M 4/386* (2013.01); *H01M 4/48* (2013.01); *H01M 4/583* (2013.01);
(Continued)

(58) Field of Classification Search
None
See application file for complete search history.

(56) References Cited

U.S. PATENT DOCUMENTS

2004/0058059 A1* 3/2004 Linford .................. B82Y 40/00
427/58
2005/0208379 A1 9/2005 Musha et al.
(Continued)

FOREIGN PATENT DOCUMENTS

CN 103579594 A 2/2014
CN 104103819 A 10/2014
(Continued)

OTHER PUBLICATIONS

Eupplementary European Search Report dated Jun. 24, 2025, issued for EP22784483.4.
(Continued)

*Primary Examiner* — Kevin M Bernatz
(74) *Attorney, Agent, or Firm* — Troutman Pepper Locke LLP

(57) ABSTRACT
To improve performance. A negative electrode material is a negative electrode material for a battery, and includes carbon, tungsten trioxide, and silicon particles (33) including silicon, and in the silicon particles (33), a ratio of the amount of Si in Si2p derived from elemental silicon to the amount of Si in Si2p derived from $SiO_2$ in a surface layer is 3 or more, on an atomic concentration basis, as measured by X-ray photoelectron spectroscopy.

8 Claims, 8 Drawing Sheets

(51) Int. Cl.

| | |
|---|---|
| *H01M 4/48* | (2010.01) |
| *H01M 4/583* | (2010.01) |
| *H01M 10/052* | (2010.01) |

(52) U.S. Cl.

CPC .... *H01M 10/052* (2013.01); *H01M 2004/021* (2013.01); *H01M 2004/027* (2013.01)

(56) References Cited

U.S. PATENT DOCUMENTS

| | | | |
|---|---|---|---|
| 2006/0051675 A1 | 3/2006 | Musha et al. | |
| 2006/0115735 A1 | 6/2006 | Yasuda et al. | |
| 2014/0038040 A1 | 2/2014 | Park et al. | |
| 2017/0062871 A1 | 3/2017 | Urata et al. | |
| 2018/0076462 A1 | 3/2018 | Takeda et al. | |
| 2019/0115588 A1 | 4/2019 | Matsuhara et al. | |
| 2021/0093579 A1* | 4/2021 | Kobayashi | C05G 3/00 |
| 2022/0216478 A1 | 7/2022 | Ito et al. | |
| 2024/0234701 A1* | 7/2024 | Chung | H01M 4/483 |
| 2025/0128959 A1* | 4/2025 | Nakada | H01M 10/0525 |

FOREIGN PATENT DOCUMENTS

| | | | |
|---|---|---|---|
| CN | 106063001 A | 10/2016 | |
| EP | 3734723 A1 | 11/2020 | |
| JP | 2005-63767 A | 3/2005 | |
| JP | 2014-32964 A | 2/2014 | |
| JP | 2015-125816 A | 7/2015 | |
| JP | 2018-045904 A | 3/2018 | |
| WO | 2015/129188 A1 | 9/2015 | |
| WO | 2021059974 A1 | 4/2021 | |

OTHER PUBLICATIONS

Ying Liu et al., "A novel propeller-like Si@WO3@C with boosted electrochemical properties as anode material for lithium-ion batteries", Vacuum, Pergamon Press, GB, vol. 184, Nov. 17, 2020, 109922, pp. 1-5. (cited in the Jun. 24, 2025 Search Report issued fotr EP22784483.4).

Office Action dated Nov. 5, 2025, issued in the corresponding Taiwanese Patent Application No. 111112539 and English translation thereof.

* cited by examiner

BINDING ENERGY(eV)

FIG.11

| | Production Condition | | Characteristics of silicon material obtained from XPS measurement | | | | | | | Characteristics of silicon material based on volume average particle diameter | | | | Characteristics of silicon material based on D50 | | | | Evaluation result | | | |
|---|---|---|---|---|---|---|---|---|---|---|---|---|---|---|---|---|---|---|---|---|---|
| Container Shape | Pulverization Duration (h) | Pulverization Atmosphere | Si Concentration (at%) | O Concentration (at%) | Concentration Ratio Si/O | Si Concentration Ratio Derived From SiO₂ (%) | Si Concentration Ratio Derived From Si (%) | Concentration Ratio Si/SiO₂ | Oxide Film Thickness (Å) | Volume Average Particle Diameter (μm) | SiO₂ Volume (μm³) | Particle Volume (μm³) | SiO₂ Volume/Particle Volume (%) | D50 (μm) | SiO₂ Volume (μm³) | Particle Volume (μm³) | SiO₂ Volume/Particle Volume (%) | Specific Capacity (mAhg⁻¹):0.2C | Specific Capacity (mAhg⁻¹):3.2C | Lithiation of Si | De-Lithiation of Si |
| First Example — 80mmφ ZrO₂ Sphere Container | 3 | Ar | 56.24 | 39.91 | 1.41 | 17.43 | 82.57 | 4.74 | 1.27 | 1.93 | 0.00148 | 3.76 | 0.039 | 0.33 | 0.0000433 | 0.0188 | 0.230 | 229 | 123 | ○ | ○ |
| Second Example — 80mmφ ZrO₂ Sphere Container | 6 | Ar | 52.98 | 45.53 | 1.22 | 23.43 | 77.97 | 3.33 | 1.80 | 2.48 | 0.00349 | 8.00 | 0.044 | 0.30 | 0.0000502 | 0.0138 | 0.363 | 227 | 128 | ○ | ○ |
| Third Example — 80mmφ ZrO₂ Sphere Container | 3 | Ar | 56.16 | 39.01 | 1.44 | 17.03 | 82.87 | 4.87 | 1.23 | 1.97 | 0.00150 | 4.00 | 0.038 | 0.33 | 0.0000421 | 0.0188 | 0.224 | 230 | 129 | ○ | ○ |
| Fourth Example — 80mmφ ZrO₂ Sphere Container | 6 | Ar | 54.78 | 41.70 | 1.31 | 21.14 | 78.86 | 3.73 | 1.61 | 2.52 | 0.00321 | 8.37 | 0.038 | 0.34 | 0.0000583 | 0.0206 | 0.284 | 224 | 120 | ○ | ○ |
| First Comparative Example — 80mmφ SUS Cylindrical Container | 1 | Air | 49.98 | 47.05 | 1.06 | 26.89 | 73.11 | 2.72 | 2.21 | 1.75 | 0.00212 | 2.80 | 0.076 | 0.25 | 0.0000432 | 0.0082 | 0.529 | 389 | 76 | × | × |
| Second Comparative Example — 80mmφ ZrO₂ Sphere Container | 1.5 | Air | 48.91 | 47.27 | 1.03 | 27.85 | 72.15 | 2.59 | 2.32 | 3.33 | 0.00806 | 19.3 | 0.042 | 0.33 | 0.0000791 | 0.0188 | 0.421 | 287 | 52 | ○ | × |

NEGATIVE ELECTRODE MATERIAL, BATTERY, PRODUCTION METHOD FOR NEGATIVE ELECTRODE MATERIAL, AND MANUFACTURING METHOD FOR BATTERY

FIELD

The present invention relates to a negative electrode material, a battery, a production method for the negative electrode material, and a manufacturing method for the battery.

BACKGROUND

As a negative electrode material for a lithium-ion rechargeable battery, carbon is used in some cases. For example, Patent Literature 1 discloses a negative electrode including tungsten trioxide applied to the surface of graphite. Application of tungsten trioxide to the surface of graphite can improve lithium ion diffusivity, and battery performance can be improved. In addition, for example, Patent Literature 2 discloses a negative electrode containing silicon particles (silicon), tungsten, and carbon.

CITATION LIST

Patent Literature

Patent Literature 1: JP 2018-45904 A
Patent Literature 2: JP 2015-125816 A

SUMMARY

Technical Problem

In the negative electrode material, tungsten trioxide or silicon is provided to improve performance, but there is room for improvement in performance.

The present invention has been made in view of the above, and an object of the present invention is to provide a negative electrode material having improved performance, a battery, a production method for the negative electrode material, and a manufacturing method for the battery.

Solution to Problem

To solve the problem described above and achieve the object, a negative electrode material according to the present disclosure is for a battery and includes carbon, tungsten trioxide, and a silicon material including silicon. In the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

To solve the problem described above and achieve the object, a battery according to the present disclosure includes: the above-described negative electrode material; and a positive electrode material.

To solve the problem described above and achieve the object, a production method for a negative electrode material according to the present disclosure is for a battery and includes the steps of: preparing a silicon raw material in an atmosphere having an oxygen concentration of 5% or less; and producing the negative electrode material including carbon, tungsten trioxide, and a silicon material by using the silicon raw material. In the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

To solve the problem described above and achieve the object, a manufacturing method for a battery according to the present disclosure includes: the above-described production method for a negative electrode material; and a step of producing a positive electrode material.

Advantageous Effects of Invention

According to the present invention, the performance of the negative electrode material can be improved.

BRIEF DESCRIPTION OF DRAWINGS

FIG. 11 is a table showing manufacturing conditions, characteristics of silicon particles, and evaluation results of examples.

DESCRIPTION OF EMBODIMENTS

Hereinafter, the present invention will be described in detail with reference to the drawings. Note that the present invention is not limited by the modes for carrying out the following invention (hereinafter, referred to as embodiments). In addition, component elements in the following embodiments include components readily conceived by those skilled in the art, and components substantially identical, so-called equivalents. Furthermore, the component elements disclosed in the following embodiments can be combined as appropriate.

Battery

Figure 1:
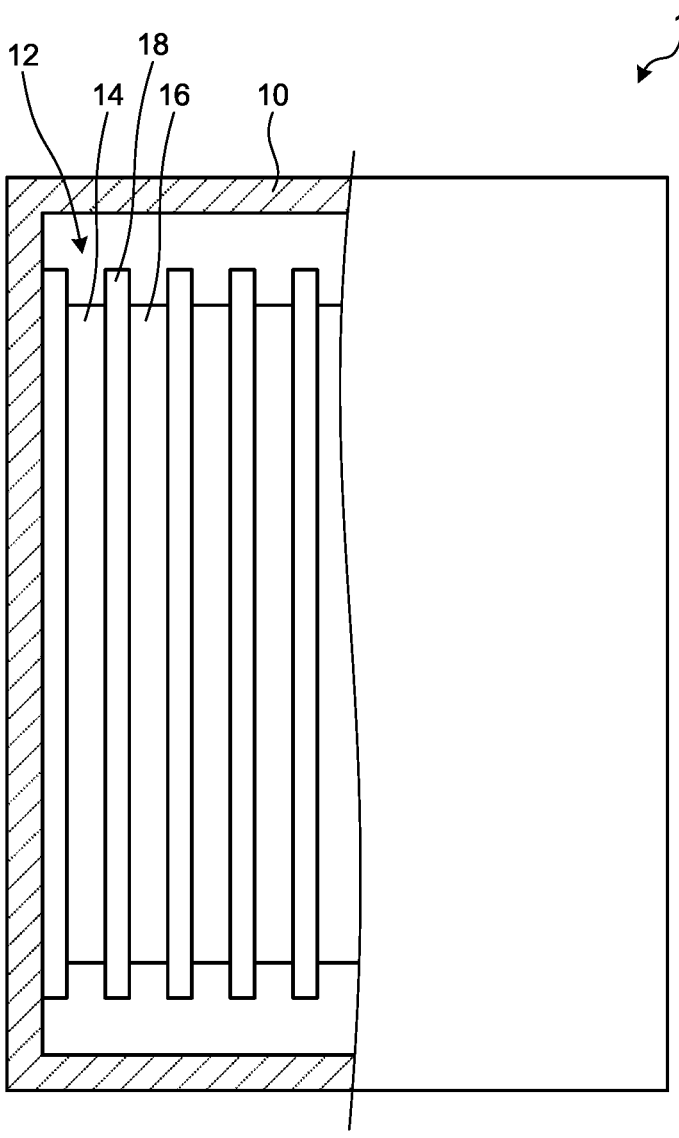
FIG. 1 is a schematic partial cross-sectional view of a battery according to the present embodiment.

FIG. 1 is a schematic partial cross-sectional view of a battery according to the present embodiment. The battery 1 according to the present embodiment is a lithium-ion rechargeable battery. The battery 1 includes a casing 10, an electrode group 12, and an electrolyte which is not illustrated. The casing 10 is a case that houses the electrode group 12 and the electrolyte inside. In addition to the electrode group 12, the casing 10 may include wiring, terminals, and the like connected to the electrode group 12.

The electrode group 12 includes a negative electrode 14, a positive electrode 16, and a separator 18. The electrode group 12 has a configuration in which the separator 18 is disposed between the negative electrode 14 and the positive electrode 16. In an example illustrated in FIG. 1, the electrode group 12 has a so-called stacked electrode group structure in which the negative electrodes 14 of rectangular shape and the positive electrodes 16 of rectangular shape are alternately stacked with the separator 18 of rectangular shape interposed therebetween. However, the electrode group 12 is not limited to the laminated electrode group structure. For example, the electrode group 12 may have a wound electrode group structure in which the negative electrode 14 of strip shape and the positive electrode 16 of strip shape are stacked and wound with the separator 18 of strip shape interposed therebetween.

Negative Electrode

Figure 2:
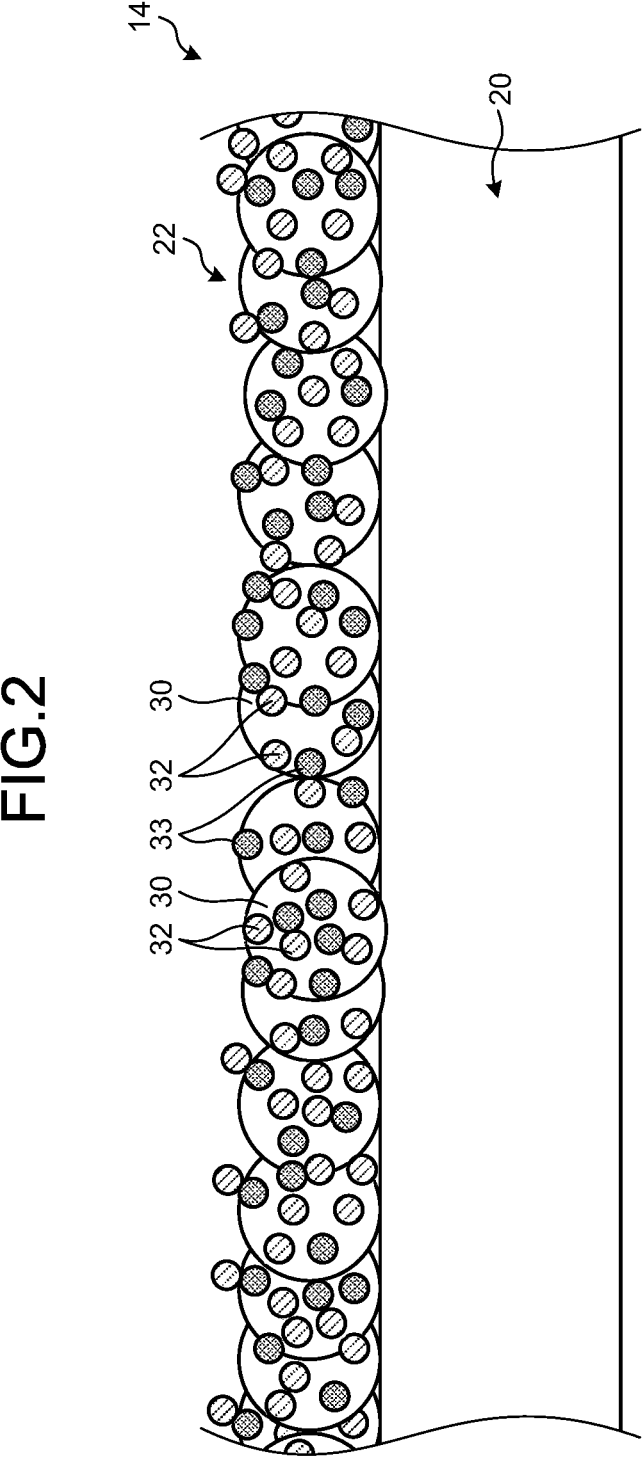
FIG. 2 is a schematic cross-sectional view of an example of a negative electrode according to the present embodiment.

FIG. 2 is a schematic cross-sectional view of an example of the negative electrode according to the present embodiment. As illustrated in FIG. 2, the negative electrode 14 includes a current collecting layer 20 and a negative electrode material layer 22. The current collecting layer 20 is a layer formed of a conductive member. An example of the conductive member of the current collecting layer 20 includes copper. The negative electrode material layer 22 is a layer including a negative electrode material according to the present embodiment. The negative electrode material layer 22 is provided on the surface of the current collecting layer 20. The current collecting layer 20 preferably has a thickness of, for example, approximately 15 μm or more and 40 μm or less, and the negative electrode material layer 22 may have a thickness of, for example, approximately 20 μm or more and 200 μm or less. Note that the negative electrode 14 may include the negative electrode material layers 22 on both surfaces of the current collecting layer 20.

The negative electrode material layer 22 includes the negative electrode material. The negative electrode material contains carbon, tungsten trioxide, and a silicon material. In the negative electrode material of the present embodiment, tungsten trioxide is provided on the surface of carbon, and the silicon material is provided on the surface of carbon, but a positional relationship between carbon, tungsten trioxide, and the silicon material is not limited thereto, and any positional relationship may be employed. More specifically, the negative electrode material for the negative electrode material layer 22 includes a carbon particle 30 which is a particle of carbon, a tungsten trioxide (WO$_3$) particle 32 is a particle of tungsten trioxide, and a silicon particle 33 which is a particle containing silicon. Note that the particles described here may have a shape not limited to a spherical shape or the like, and may have any shape such as a linear shape or a sheet shape.

Tungsten trioxide provided on the surface of carbon is at least one of tungsten trioxide directly fixing on carbon, tungsten trioxide indirectly fixing on carbon via silicon fixed on carbon, tungsten trioxide fixed on carbon and fixing silicon indirectly on carbon therethrough, and tungsten trioxide forming a composite particle directly or indirectly fixed on carbon by being directly fixed to silicon. Note that the negative electrode material in the present embodiment preferably includes at least carbon and the silicon material to which tungsten trioxide is fixed. In addition, the negative electrode material of the present embodiment may include carbon, tungsten trioxide, and the silicon material, not containing any material other than carbon, tungsten trioxide, and the silicon material, except for inevitable impurities. In addition, the negative electrode material of the present embodiment may contain the balance of the inevitable impurities.

The negative electrode material of the negative electrode material layer 22 includes a plurality of carbon particles 30. The carbon particles 30 contain amorphous carbon or graphite.

The amorphous carbon is amorphous carbon having no crystal structure. The amorphous carbon is sometimes called diamond-like carbon and can also be said to be carbon having a mixture of sp2 bonds and sp3 bonds. The carbon particle of the amorphous carbon is formed of amorphous carbon as a whole, and preferably contains no components other than the amorphous carbon except for the inevitable impurities. Specifically, the carbon particle of the amorphous carbon preferably contains no graphite.

In addition, the amorphous carbon can include a functional group (e.g., hydroxy group and carboxyl group) on the surface, during processing of applying tungsten trioxide to the surface. Therefore, the functional group can appropriately trap tungsten trioxide on the surface of the amorphous carbon, and tungsten trioxide can be appropriately applied to the surface. In addition, the functional group fixes the tungsten trioxide to the surface of the amorphous carbon, increasing the adhesion of the tungsten trioxide to the surface of the amorphous carbon, suppressing the separation of the tungsten trioxide from the surface of the carbon. In particular, a hard carbon raw material is manufactured at a temperature lower than that of, for example, graphite, and therefore, the functional group tends to remain without being removed, and tungsten trioxide and silicon can be appropriately applied to the surface.

Graphite is carbon having a planar crystal structure.

The carbon particles 30 preferably have an average particle diameter of 1 μm or more and 50 μm or less, and more preferably 1 μm or more and 20 μm or less. When the average particle diameter is within this range, the strength of the electrode film can be maintained.

The negative electrode material of the negative electrode material layer 22 further includes a plurality of WO$_3$ particles 32 and silicon particles (silicon material) 33. More specifically, the plurality of WO$_3$ particles 32 and silicon particles 33 are provided for each carbon particle 30. One of the plurality of WO$_3$ particles 32 is provided on the surface of the carbon particle 30. The other of the plurality of WO$_3$ particles 32 is provided on the surface of the silicon particle 33. More specifically, the silicon particle 33 is in adhesion (contact) with the surfaces of the carbon particle 30, and the WO$_3$ particle 32 is in adhesion (contact) with the surface of the silicon particle 33. The carbon particle 30, the WO$_3$ particle 32, and the silicon particle 33 may be composed. Alternatively, the carbon particle 30 and the silicon particle 33 may be composed, and the carbon particle 30 and the WO$_3$ particle 32 may be composed. Therefore, the negative electrode material of the negative electrode material layer 22 has a configuration in which the carbon particles 30, the WO$_3$ particles 32, and the silicon particles 33 are composed, but may further include at least one of a configuration in which the carbon particles 30 and the silicon particles 33 are composed and a configuration in which the carbon particles 30 and the WO$_3$ particles 32 are composed.

Here, the composition refers to a state in which it is impossible to separate the silicon particles 33 from the carbon particles 30, separate the silicon particles 33 from the WO$_3$ particles 32, and separate the WO$_3$ particles 32 from the carbon particles 30, at least when an external force does not act. For example, the external force refers to a force caused by expansion and contraction of a solid electrolyte interphase (SEI) film formed to cover the entire surface layer when a battery using the negative electrode material is operated.

For example, the composition includes at least one of forming a composite in which the silicon particles 33 are applied to the surfaces of the carbon particles 30 and the $WO_3$ particles 32 are applied to the surfaces of the silicon particles 33, forming a composite in which the $WO_3$ particles 32 are applied to the surfaces of the carbon particles 30 and the silicon particles 33 are arranged on the surfaces of the $WO_3$ particles 32, forming a composite in which the silicon particles 33 are applied to the surfaces of the carbon particles 30, forming a composite in which the $WO_3$ particles 32 are applied to the surfaces of the carbon particles 30, forming a composite in which the $WO_3$ particles 32 are applied to the surfaces of the silicon particles 33, and applying the $WO_3$ particles 32 and the silicon particles 33 to the surfaces of the carbon particles 30 and bringing the $WO_3$ particles 32 and the silicon particles 33 into adhesion with each other.

The $WO_3$ particles 32 include $WO_3$ particles 32 having a hexagonal crystal structure and $WO_3$ particles 32 having a monoclinic, triclinic, and orthorhombic crystal structures. In other words, the negative electrode material includes tungsten trioxide having a hexagonal crystal structure, and tungsten trioxide having a monoclinic and triclinic crystal structures. However, the negative electrode material may include at least one of tungsten trioxide having the hexagonal crystal structure, tungsten trioxide having the monoclinic crystal structure, and tungsten trioxide having the triclinic crystal structure. In summary, the negative electrode material preferably includes at least one of hexagonal, monoclinic, and triclinic tungsten trioxide, more preferably includes hexagonal tungsten trioxide and monoclinic or triclinic tungsten trioxide, and still more preferably contains hexagonal, monoclinic, and triclinic tungsten trioxide. Note that when the negative electrode material includes tungsten trioxide having other crystal structures such as monoclinic and triclinic crystal structures in addition to the hexagonal tungsten trioxide, the content of tungsten trioxide having the hexagonal crystal structure from among tungsten trioxide having the respective crystal structures is preferably maximum. However, the crystal structures of tungsten trioxide included in the negative electrode material are not limited thereto, and for example, tungsten trioxide having another crystal structure may be included. Furthermore, the negative electrode material may include amorphous tungsten trioxide.

The average particle diameter of the $WO_3$ particles 32 is smaller than the average particle diameter of the carbon particles 30. The average particle diameter of the $WO_3$ particles 32 is preferably 100 nm or more and 20 μm or less, and more preferably 100 nm or more and 1 μm or less.

As described above, the negative electrode material has but is not limited to a structure in which particulate tungsten trioxide ($WO_3$ particles 32) and silicon (silicon particles 33) are provided on the surfaces of the carbon particles 30. The negative electrode material preferably has a structure in which tungsten trioxide and the silicon material are provided on the surface of carbon, and the tungsten trioxide and the silicon material which are provided on the surface of carbon may have any shapes. In the present embodiment, tungsten trioxide is used as a tungsten compound or a tungsten oxide. Furthermore, in the present embodiment, silicon is used as the silicon particles 33, but a silicon compound may be used.

Note that the negative electrode material layer 22 may include a substance other than the negative electrode material (carbon particles 30, $WO_3$ particles 32, and silicon particles 33). The negative electrode material layer 22 may include, for example, a binder. The binder may use any material, such as polyvinylidene fluoride (PVDF), carboxymethyl cellulose (CMC), styrene butadiene rubber (SBR), and polyacrylic acid (PAA). Only one kind of binder may be used or two or more kinds of binders may be used in combination. However, when the carbon particle 30 is amorphous carbon, it is preferable for the negative electrode material layer 22, in other words, the negative electrode material to include no graphite.

The identification of carbon, tungsten trioxide, and silicon can be performed by an X-ray diffraction method. For example, a peak waveform obtained from a result of the X-ray diffraction analysis of an analyte shows a peak waveform of carbon, but it can be determined that the carbon is amorphous carbon when a (002) peak waveform in a known graphite structure is broad. Furthermore, for example, when a position (angle) showing a peak in a result of the X-ray diffraction analysis of the analyte coincides with a position showing a peak in known tungsten trioxide, it can be determined that the analyte contains tungsten trioxide. In addition, for example, when a position (angle) showing a peak in the X-ray diffraction analysis result of the analyte coincides with a position indicating a peak in known silicon, it can be determined that the analyte contains silicon.

Furthermore, application of the $WO_3$ particles 32 and silicon particles 33 on the surfaces of the carbon particles 30 can be confirmed by observation with an electron microscope such as a scanning electron microscope (SEM) or a transmission electron microscope (TEM).

Furthermore, an element ratio of carbon, tungsten trioxide, and silicon of the negative electrode material in the present embodiment can be measured by emission spectrometry.

For the negative electrode material of the present embodiment, chemical components of silicon, tungsten, and oxygen are measured, and the rest may be carbon. Silicon and tungsten can be measured by an inductivity coupled plasma optical emission spectroscopy (ICP-OES) (manufacturer name "Agilent", device product name "720 ES"), and oxygen can be measured by an inert gas fusion-infrared absorption method (manufacturer name "LECO", device product name "ONH836"). When a total of three elements of the silicon material, tungsten trioxide, and carbon is 100 wt % in the negative electrode material as a product, the content of the silicon material is preferably 1 wt % or more and 10 wt % or less, more preferably 1 wt % or more and 8 wt % or less or 2 wt % or more and 8 wt % or less, and still more preferably 1.5 wt % or more and 7 wt % or less or 1.8 wt % or more and 7 wt % or less. When a total of the three elements of the silicon material, tungsten trioxide, and carbon is 100 wt % in the negative electrode material as a product, the content of tungsten trioxide is preferably 1 wt % or more and 10 wt % or less, more preferably 2 wt % or more and 8 wt % or less, and still more preferably 3 wt % or more and 5 wt % or less.

In addition, when a total of the three elements of the silicon material, tungsten trioxide, and carbon is 100 wt % in the negative electrode material as a product, a ratio of the content (wt %) of the silicon material to the content (wt %) of tungsten trioxide is preferably 0.2 or more and 2.5 or less, more preferably 0.2 or more and 2.0 or less or 0.5 or more and 2.0 or less, and still more preferably 0.3 or more and 1.8 or less or 0.4 or more and 1.7 or less.

Furthermore, in the negative electrode material of the negative electrode material layer 22, the silicon particle 33 may be in adhesion (contact) with the surface of the carbon particle 30, and the $WO_3$ particle 32 may be in adhesion (contact) with the surface of the carbon particle 30. In this configuration, the carbon particle 30 and the silicon particle 33 may be composed, and the carbon particle 30 and the $WO_3$ particle 32 may be composed.

As described above, the negative electrode material has but is not limited to a structure in which particulate tungsten trioxide ($WO_3$ particles 32) and the silicon particles 33 are provided on the surfaces of the carbon particles 30. The negative electrode material preferably has a structure in which tungsten trioxide and the silicon material are provided on the surface of carbon, and the tungsten trioxide and the silicon material which are provided on the surface of carbon may have any shapes.

Silicon Particle

Figure 3:
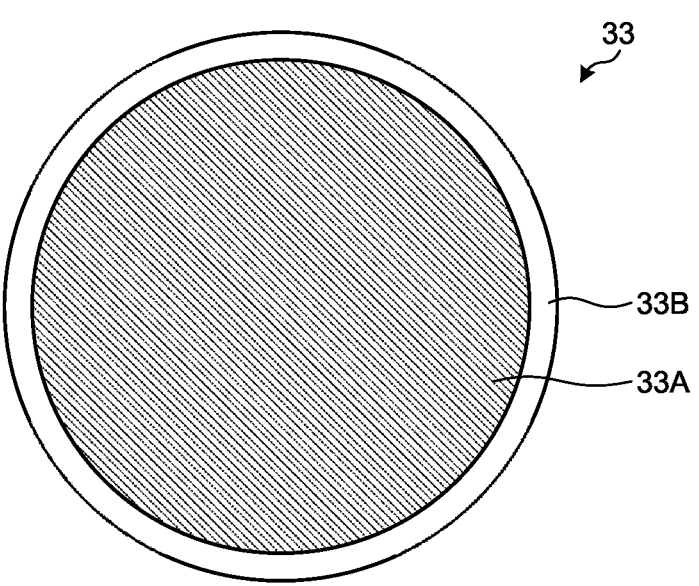
FIG. 3 is a schematic cross-sectional view of a silicon material.

FIG. 3 is a schematic cross-sectional view of the silicon particle. As illustrated in FIG. 3, the silicon particle 33 includes a Si layer 33A and an oxide layer 33B. The Si layer 33A is a layer including Si, and can be said to be a portion serving as a core of the silicon particle 33. The Si layer 33A preferably includes no element other than Si except for the inevitable impurities. The oxide layer 33B is a layer formed on the surface of the Si layer 33A, and preferably covers the entire surface of the Si layer 33A. It can be said that the oxide layer 33B is a layer serving as the outermost surface of the silicon particle 33. The oxide layer 33B is a layer including a silicon oxide ($SiO_x$). The oxide layer 33B includes $SiO_2$ as the silicon oxide, but may include a silicon oxide other than $SiO_2$, for example, SiO. The oxide layer 33B preferably includes no element other than elements constituting the silicon oxide, except for the inevitable impurities.

Characteristics of Silicon Particles Based on XPS

Next, the characteristics of the silicon particles 33 as measured by X-ray photoelectron spectroscopy (XPS) will be described. Hereinafter, unless otherwise specified, measurement conditions of the X-ray photoelectron spectroscopy are as follows.

Measurement apparatus: PHI 5000 Versa ProbeII (manufactured by ULVAC-PHI, Inc.)

Excited X-ray: monochrome Al $K\alpha$ ray

Output: 50 W

Pass energy: 187.85 eV (survey), 46.95 eV (narrow)

Measurement interval: 0.8 eV/step (survey), 0.1 eV/step (narrow)

Photoelectron take-off angle with respect to a sample surface: 45°

X-ray diameter: 200 μm

Ratio of Amount of Si Derived from Elemental Silicon to Amount of Si Derived from $SiO_2$ In the silicon particles 33, a ratio of the amount of Si in Si2p derived from elemental silicon to the amount of Si in Si2p derived from $SiO_2$ in the surface layer is 3.0 or more, preferably 3.5 or more, and more preferably 4 or more, on an atomic concentration basis, as measured by the X-ray photoelectron spectroscopy.

Here, the surface layer refers to a range from the surface to a depth at which a photoelectron is allowed to escape from the sample, and is described in, for example, the article J. D. Lee et al., Journal surface analysis Vol 16, No. 1 (2009) PP. 42-63, FIG. 5. Furthermore, a depth range in which the photoelectrons can be observed when the silicon particles 33 are measured by the X-ray photoelectron spectroscopy under the above measurement conditions may be referred to as the surface layer.

The photoelectron take-off angle with respect to the sample surface is 45°, and therefore, when a flat surface such as a Si wafer is employed, a measurement depth of the photoelectron detected is 0.71 times that of $\theta=90°$, according to depth $d'=d \cos \theta$ ($\theta$ is the photoelectron take-off angle with respect to the sample surface, and d is a photoelectron escape depth). However, since the measurement was performed this time with particulate silicon applied on a flat plate, it can be considered that photoelectrons from the surfaces of particles facing the detector are mainly detected, and thus no correction was performed for the photoelectron take-off angle with respect to the sample surface.

In addition, Si in Si2p refers to a Si atom from which an electron in a 2p orbital is emitted by the X-ray photoelectron spectroscopy. Si in Si2p derived from $SiO_2$ refers to Si constituting $SiO_2$, from which an electron in the 2p orbital is emitted by the X-ray photoelectron spectroscopy, and Si in Si2p derived from the elemental silicon refers to Si constituting the elemental silicon (metal silicon), from which an electron in the 2p orbital is emitted by the X-ray photoelectron spectroscopy.

The ratio of the amount of Si in Si2p derived from the elemental silicon to the amount of Si in Si2p derived from $SiO_2$ in the surface layer represents a ratio of the atomic concentration of Si (Si atoms) derived from the elemental silicon from which electrons in the 2p orbitals are emitted to the atomic concentration of Si (Si atoms) derived from $SiO_2$ from which an electron in the 2p orbital is emitted, in the surface layer (here, for example, from the outermost surfaces of the silicon particles 33 to positions approximately 6 angstroms deeper than the outermost surfaces). In the silicon particles 33, when the ratio of the amounts between Si in Si2p derived from the elemental silicon and Si in Si2p derived from $SiO_2$ is within this range (3.0 or more, on the atomic concentration basis), the amount of the oxide in the vicinity of the surface decreases and the capacity of the negative electrode material can be improved. In addition, the oxide layer on the surface is reduced in thickness, penetration and desorption of Li ions is facilitated, reducing impedance. In the silicon particles 33, the ratio of the amount of Si in Si2p derived from elemental silicon to the amount of Si in Si2p derived from $SiO_2$ in the surface layer is preferably 9 or less, more preferably 19 or less, and still more preferably 99 or less, on the atomic concentration basis, as measured by the X-ray photoelectron spectroscopy. In the silicon particles 33, when the ratio of the amount of Si to the amount of $SiO_2$ is within this range (99 or less), preparation of excessive facilities or processes for preventing oxidation of the silicon particle is not required and the decrease in productivity can be suppressed while improving the capacity of the negative electrode material. As described above, when the silicon particles 33 are measured by the X-ray photoelectron spectroscopy, the ratio of the amount of Si in Si2p derived from the elemental silicon to the amount of Si in Si2p derived from $SiO_2$ in the surface layer is preferably 3 or more and 9 or less, more preferably 3 or more and 19 or less, and still more preferably 3 or more and 99 or less, on the atomic concentration basis. In addition, when the silicon particles 33 are measured by the X-ray photoelectron spectroscopy, the ratio of the amount of Si in Si2p derived from the elemental silicon to the amount of Si in Si2p derived from $SiO_2$ in the surface layer is preferably 3.5 or more and 9 or less, more preferably 3.5 or more and 19 or less, and still more preferably 3.5 or more and 99 or less, on the atomic concentration basis. Furthermore, when the silicon particles 33 are measured by the X-ray photoelectron spectroscopy, the ratio of the amount of Si in Si2p derived from the elemental silicon to the amount of Si in Si2p derived from $SiO_2$ in the surface layer is preferably 4 or more and 9 or less, more preferably 4 or more and 19 or less, and still more preferably 4 or more and 99 or less, on the atomic concentration basis.

Note that, for example, when the amount of Si in Si2p derived from $SiO_2$ is 1%, Si in Si2p derived from the elemental silicon is 99%. Therefore, the ratio of the amount of Si in Si2p derived from the elemental silicon to the amount of Si in Si2p derived from $SiO_2$ in the surface layer is 99. Similarly, when the amount of Si in Si2p derived from $SiO_2$ is 5%, the amount of Si in Si2p derived from the elemental silicon is 95%. Therefore, the ratio of the amount of Si in Si2p derived from the elemental silicon to the amount of Si in Si2p derived from $SiO_2$ in the surface layer is 19.

Figure 4:
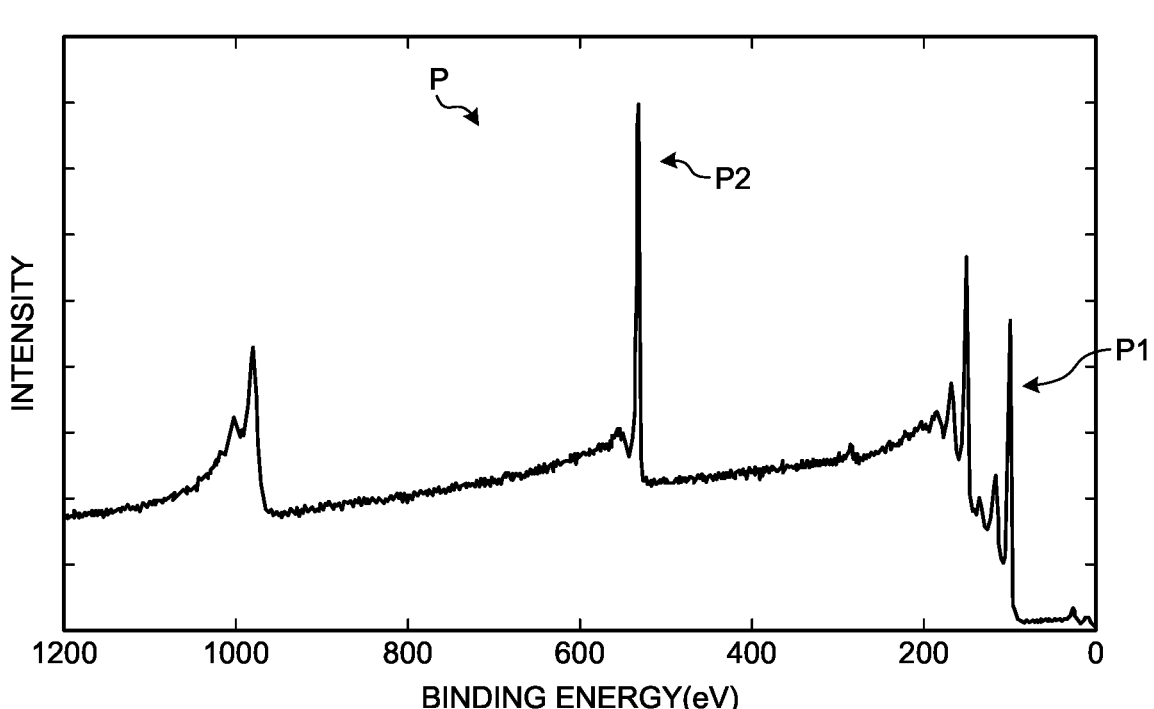
FIG. 4 is a graph illustrating an example of a survey spectrum showing a result of measurement of a silicon material by XPS.
Figure 5:
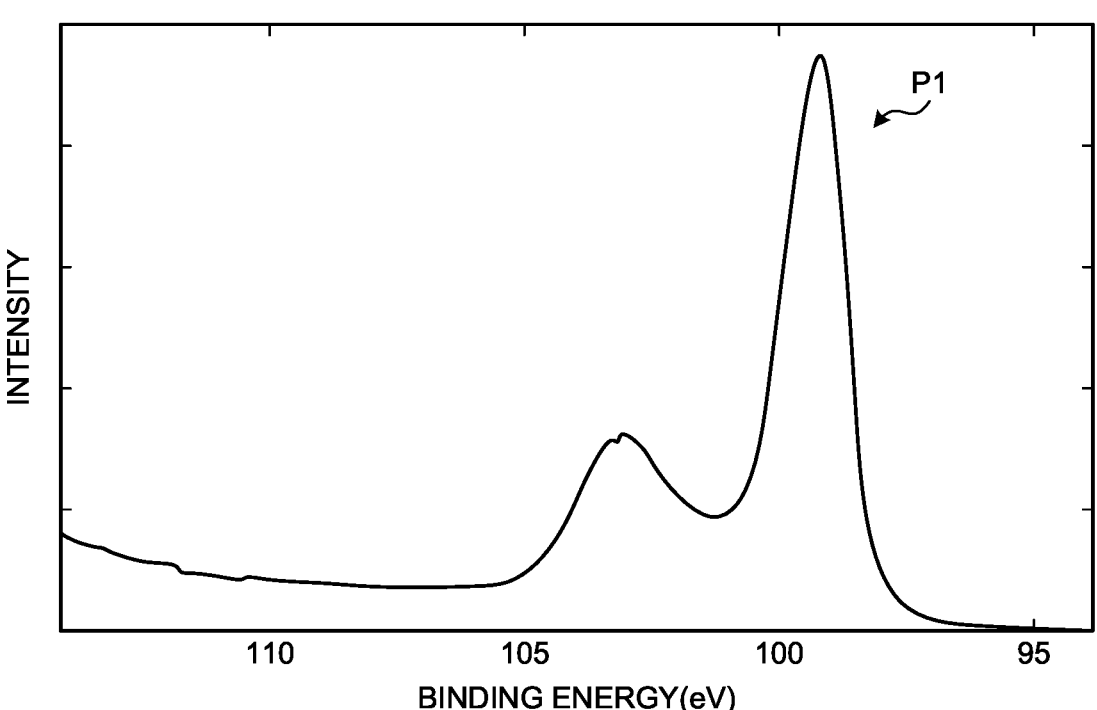
FIG. 5 is a graph illustrating an example of a narrow spectrum of Si2p showing a result of measurement of the silicon material by XPS.
Figure 6:
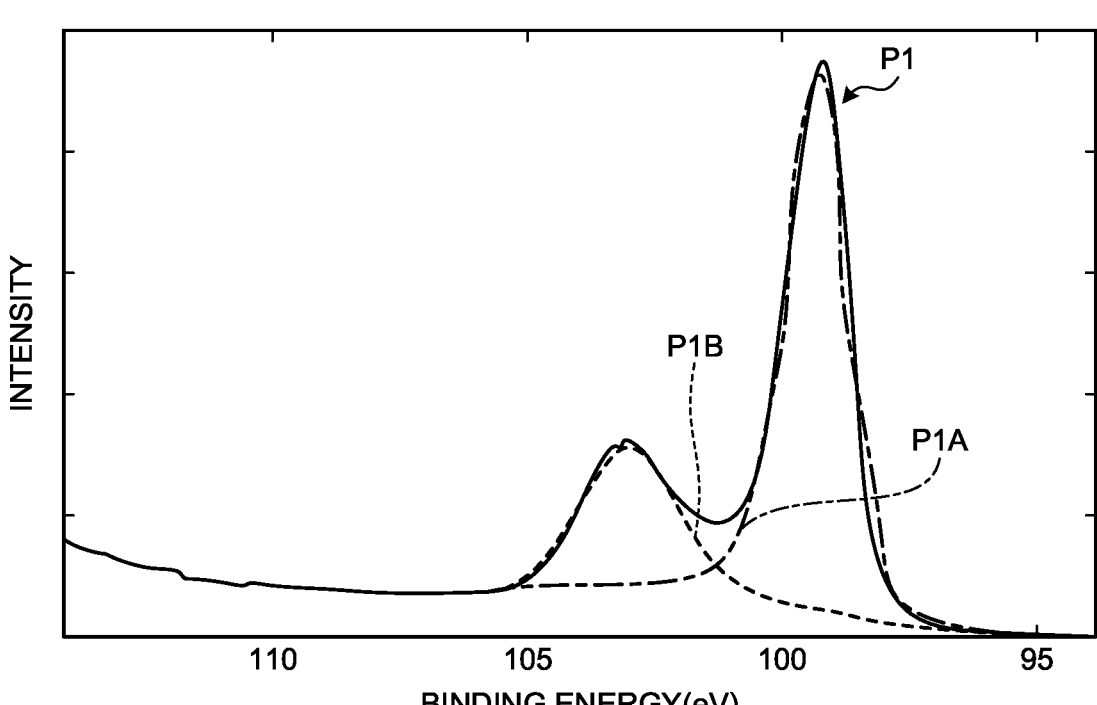
FIG. 6 is a graph illustrating an example of peak separation of the narrow spectrum of Si2p showing a result of measurement of the silicon material by XPS.
Figure 7:
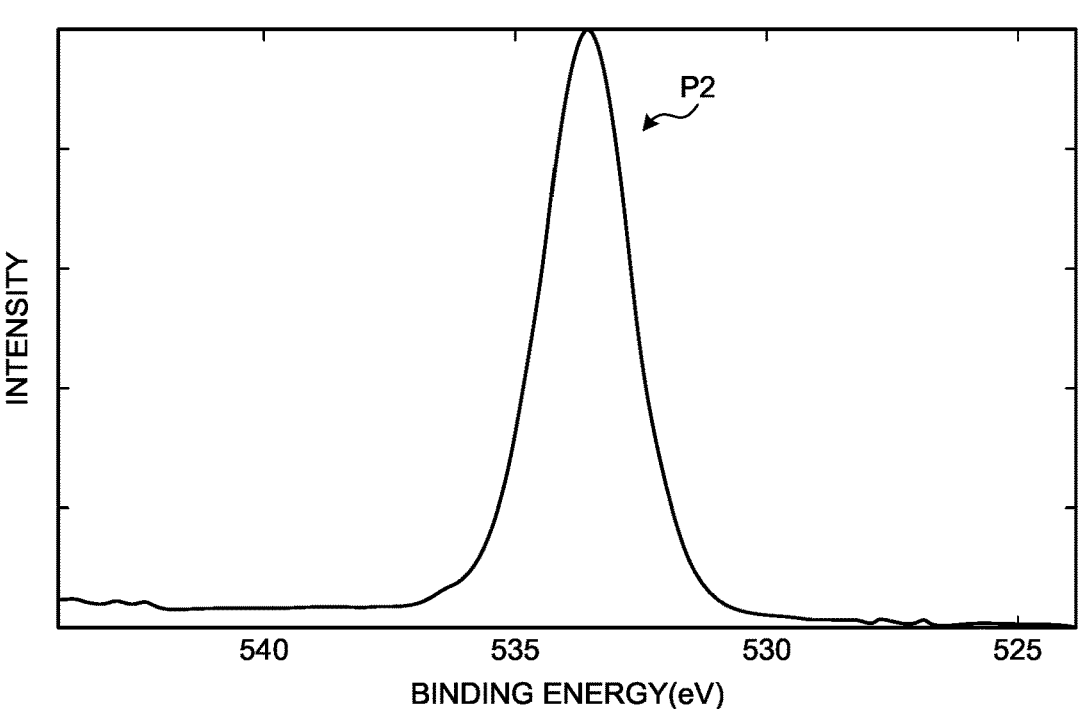
FIG. 7 is a graph illustrating an example of a narrow spectrum of O1s showing a result of measurement of the silicon material by XPS.

Here, a method of calculating the ratio between the amount of Si in Si2p derived from $SiO_2$ and the amount of Si in Si2p derived from the elemental silicon as measured by the X-ray photoelectron spectroscopy will be described. FIG. 4 is a graph illustrating an example of a survey spectrum showing a result of measurement of the silicon material by the XPS, FIG. 5 is a graph illustrating an example of a narrow spectrum of Si2p showing a result of measurement of the silicon material by the XPS, FIG. 6 is a graph illustrating an example of peak separation of the narrow spectrum of Si2p showing a result of measurement of the silicon material by the XPS, and FIG. 7 is a graph illustrating an example of a narrow spectrum of O1s showing a result of measurement of the silicon material by the XPS. FIG. 4 illustrates an example of peak waveforms P of the silicon particles 33 in wide scan analysis, with a peak waveform P1 at approximately a binding energy of 100 eV indicating a peak of Si2p. FIG. 5 illustrates an example of a waveform of the silicon particles 33 in narrow scan analysis in the vicinity of the peak waveform P1, with background removed and the peak of Si2p extracted. Here, Si in Si2p derived from $SiO_2$ and Si in Si2p derived from the elemental silicon have different binding energies due to a difference in binding state. Therefore, as illustrated in FIG. 6, the peak waveform P1 is separable into a peak waveform P1A indicating Si2p derived from the elemental silicon and a peak waveform P1B indicating Si2p derived from $SiO_2$. The peak waveform P1A is a waveform having one peak around a binding energy of 99 eV, and the peak waveform P1B is a waveform having one peak around a binding energy of 103 eV. Background removal from the peak waveforms was performed mainly by the Shirley method, for correction of the baseline, by using Multipak version 9.9.0.8 attached to the X-ray photoelectron spectroscope as software.

In the present embodiment, the ratio of the area of the peak waveform P1A to the area of the peak waveform P1B is calculated as the ratio of the amount of Si in Si2p derived from the elemental silicon to the amount of Si in Si2p derived from $SiO_2$ on an atomic concentration basis.

Si Concentration Ratio Derived from Si

In addition, a ratio of the atomic concentration of Si in Si2p derived from the elemental silicon to the atomic concentration of all Si atoms in Si2p (all Si atoms from which electrons in the 2p orbital are emitted) in the surface layers of the silicon particles 33 is defined as a Si concentration ratio derived from Si (first Si concentration). The Si concentration ratio derived from Si can be calculated as a ratio of the area of the peak waveform P1A to the area of the peak waveform P1. The Si concentration ratio derived from Si is preferably 75% or more, more preferably 77% or more, and still more preferably 80% or more. When the Si concentration ratio derived from Si is within this range, the amount of oxide in the vicinity of the surface is reduced, and the capacity of the negative electrode material can be improved. The Si concentration ratio derived from Si is preferably 90% or less, more preferably 95% or less, and still more preferably 99% or less. When the Si concentration ratio derived from Si is within this range, preparation of excessive facilities or processes for preventing oxidation of the silicon particle are not required and the decrease in productivity can be suppressed while improving the capacity of the negative electrode material.

Si Concentration Ratio Derived from $SiO_2$

In addition, a ratio of the atomic concentration of Si in Si2p derived from $SiO_2$ to the atomic concentration of all Si atoms in Si2p in the surface layers of the silicon particles 33 is defined as a Si concentration ratio derived from $SiO_2$. The Si concentration ratio derived from $SiO_2$ can be calculated as a ratio of the area of the peak waveform P1B to the area of the peak waveform P1. The Si concentration ratio derived from $SiO_2$ is preferably 25% or less, more preferably 23% or less, and still more preferably 20% or less. When the Si concentration ratio derived from $SiO_2$ is within this range, the amount of oxide in the vicinity of the surface is reduced, and the capacity of the negative electrode material can be improved. In addition, the Si concentration ratio derived from $SiO_2$ is preferably 10% or more, more preferably 5% or more, and still more preferably 1% or more. When the Si concentration ratio derived from $SiO_2$ is within this range, preparation of excessive facilities or processes for preventing oxidation of the silicon particle are not required and the decrease in productivity can be suppressed while improving the capacity of the negative electrode material.

Ratio of Amount of Si to Amount of O

In the silicon particles 33, a ratio of the amount of Si in Si2p to the amount of O in O1s in the surface layers is preferably 1.2 or more, more preferably 1.3 or more, and still more preferably 1.4 or more, on the atomic concentration basis, as measured by the X-ray photoelectron spectroscopy.

O in O1s refers to an O atom from which an electron in a 1s orbital is emitted by the X-ray photoelectron spectroscopy.

The ratio of the amount of Si in Si2p to the amount of O in O1s in the surface layers refers to a ratio of the atomic concentration of Si in Si2p (Si atoms from which electrons in the 2p orbitals are emitted) in the surface layers (e.g., to positions approximately 10 angstroms deeper than the outermost surfaces) of the silicon particles 33, to the atomic concentration of O in O1s (O atoms from which electrons in the 1s orbitals are emitted) in the surface layers (e.g., from the outermost surfaces to positions approximately 6 angstroms deeper than the outermost surface) of the silicon particles 33. In the silicon particles 33, when the ratio of the amount of Si in Si2p to the amount of O in O1s is within this range, the amount of oxide in the vicinity of the surface is reduced, and the capacity of the negative electrode material can be improved. In particular, silicon oxides (e.g., SiO etc.) other than $SiO_2$ may also act as a factor suppressing the improvement of the capacity. In such a case, when the ratio of the amount of Si to the amount of O is within the above range, the amount of the silicon oxides other than $SiO_2$ can be reduced, and the capacity can be appropriately improved. Furthermore, in the silicon particles 33, the ratio of the amount of Si in Si2p to the amount of O in O1s in the surface layers is preferably 4 or less, more preferably 9 or less, and still more preferably 99 or less, on the atomic concentration basis, as measured by the X-ray photoelectron spectroscopy. In the silicon particles 33, when the ratio of the amount of Si to the amount of O is within this range, preparation of excessively pure Si is not required and the decrease in productivity can be suppressed while improving the capacity of the negative electrode material. As described above, when the silicon particles 33 are measured by the X-ray photoelectron spectroscopy, the ratio of Si in Si2p to the amount of O in O1s in the surface layers is preferably 1.2 or more and 4 or less, more preferably 1.2 or more and 9 or less, and still more preferably 1.2 or more and 99 or less, on the atomic concentration basis. Furthermore, when the silicon particles 33 are measured by the X-ray photoelectron spectroscopy, the ratio of Si in Si2p to the amount of O in O1s in the surface layers is preferably 1.3 or more and 4 or less, more preferably 1.3 or more and 9 or less, and still more preferably 1.3 or more and 99 or less, on the atomic concentration basis. Furthermore, when the silicon particles 33 are measured by the X-ray photoelectron spectroscopy, the ratio of Si in Si2p to the amount of O in O1s in the surface layers is preferably 1.4 or more and 4 or less, more preferably 1.4 or more and 9 or less, and still more preferably 1.4 or more and 99 or less, on the atomic concentration basis.

Note that, for example, when the Si concentration is 80 at % and an O concentration is 20 at %, the ratio of Si in Si2p to the amount of O in O1s in the surface layers is 4, and when the O concentration is 5 at % and the Si concentration is 95 at %, the ratio of Si in Si2p to the amount of O in O1s in the surface layers is 19.

Here, a method of calculating the ratio of the amount of Si in Si2p to the amount of O in O1s as measured by the X-ray photoelectron spectroscopy will be described. Qualitative analysis which is called survey spectrum of FIG. 4 is performed. Next, for elements whose presence is confirmed by measurement of the survey spectrum, a narrow spectrum at a binding energy corresponding to an orbital level defined for each of the elements is measured. For example, FIG. 5 illustrates a narrow spectrum of Si2P, and FIG. 7 illustrates a narrow spectrum of O1s. In addition, if there is a trace element, a narrow spectrum of the element is similarly measured. Correction of the background of each narrow spectrum is performed to obtain a peak area. The peak area is multiplied by a sensitivity coefficient corresponding to the orbital level of each element to obtain the concentration (atomic concentration) of the element. A series of atomic concentration calculations can be obtained using analysis software Multi Pack provided with PHI 5000 Versa ProbeII. The results thus obtained are illustrated in FIG. 11, as the Si concentration (second Si concentration) and the O concentration. From these concentrations, the ratio of Si/O was determined.

In other words, the ratio of the Si concentration to the O concentration obtained as described above is a concentration ratio Si/O.

Si Concentration

The Si concentration is preferably 50 at % or more, more preferably 55 at % or more, and still more preferably 60 at % or more. When the Si concentration is within this range, the amount of oxide in the vicinity of the surface is reduced, and the capacity of the negative electrode material can be improved. In addition, the Si concentration is preferably 80 at % or less, more preferably 90 at % or less, and still more preferably 99 at % or less. When the Si concentration is within this range, preparation of excessive facilities or processes for preventing oxidation of the silicon particle are not required and the decrease in productivity can be suppressed while improving the capacity of the negative electrode material.

O Concentration

The O concentration is preferably 46 at % or less, more preferably 40 at % or less, and still more preferably 30 at % or less. When the O concentration is within this range, the amount of oxide in the vicinity of the surface is reduced, and the capacity of the negative electrode material can be improved. In addition, the O concentration is preferably 20 at % or more, more preferably 10 at % or more, and still more preferably 1 at % or more. When the O concentration is within this range, preparation of excessive facilities or processes for preventing oxidation of the silicon particle are not required and the decrease in productivity can be suppressed while improving the capacity of the negative electrode material.

Thickness of Oxide Layer

In the silicon particle 33, the thickness of the oxide layer 33B is preferably 2.1 angstroms or less, more preferably 1.8 angstroms or less, and still more preferably 1.3 angstroms or less. When the thickness of the oxide layer 33B is within this range, the amount of oxide in the vicinity of the surface is reduced, and the capacity of the negative electrode material can be improved. Furthermore, the thickness of the oxide layer 33B is preferably 0.7 angstroms or more, more preferably 0.3 angstroms or more, and still more preferably 0.06 angstroms or more. When the thickness of the oxide layer 33B is in this range, preparation of excessively pure Si is not required and the decrease in productivity can be suppressed while improving the capacity of the negative electrode material. Note that the thickness of the oxide layer 33B is calculated by multiplying the ratio of the amount of Si in Si2p derived from $SiO_2$ to the amount of Si in Si2p derived from the elemental silicon (the reciprocal of the ratio of the amount of Si in Si2p derived from the elemental silicon to the amount of Si in Si2p derived from $SiO_2$) in the surface layer, by 6 angstroms. The amounts are cal as measured by the X-ray photoelectron spectroscopy, and 6 angstroms are the photoelectron escape depth of Si in Si2p.

Characteristics of Silicon Particles Based on Volume Average Particle Diameter

Next, characteristics of the silicon particles 33 based on the volume average particle diameter will be described.

Volume Average Particle Diameter

A volume average particle diameter (volume-based average particle diameter) of the silicon particles 33 measured by a laser diffraction method is hereinafter referred to as volume average particle diameter.

Volume Ratio of Oxide Layer Based on Volume Average Particle Diameter

When the volume is calculated using the volume average particle diameter assuming that the silicon particles 33 are spherical, the ratio of the volume of the oxide layers 33B to a total volume of the silicon particles 33 is defined as a volume ratio of the oxide layers 33B based on the volume average particle diameter. In this case, the volume ratio of the oxide layers 33B based on the volume average particle diameter is preferably 0.05% or less, more preferably 0.04% or less, and still more preferably 0.035% or less. When the volume ratio is within this range, the amount of oxide in the vicinity of the surface is reduced, and the capacity of the negative electrode material can be improved. Furthermore, the volume ratio of the oxide layers 33B based on the volume average particle diameter is preferably 0.015% or more, more preferably 0.01% or more, and still more preferably 0.001% or more. When the volume ratio is within this range, preparation of excessive facilities or processes for preventing oxidation of the silicon particle are not required and the decrease in productivity can be suppressed while improving the capacity of the negative electrode material.

The volume ratio of the oxide layers 33B based on the volume average particle diameter can be calculated as follows. In other words, assuming that the silicon particles 33 are spherical (true sphere), the volume of the silicon particles 33 is calculated using the volume average particle diameter as the diameter of the silicon particles 33. Then, the diameters of the Si layers 33A are calculated by subtracting the thicknesses of the oxide layers 33B calculated as described above from the volume average particle diameter, and assuming that the Si layers 33A are spherical (true sphere), the volume of the Si layers 33A is calculated using the diameters of the Si layers 33A. A value obtained by subtracting the volume of the Si layers 33A from the volume of the silicon particles 33 calculated in this manner is defined as the volume of the oxide layers 33B. The ratio of the volume of the oxide layers 33B to the volume of the silicon particles 33 is defined as the volume ratio of the oxide layers 33B based on the volume average particle diameter.

Characteristics of Silicon Particles Based on D50

Next, characteristics of the silicon particles 33 based on D50 will be described.

D50

In a volume-based particle size distribution measured by a laser diffraction method, a particle diameter at a cumulative frequency of 50 vol % is defined as D50.

Volume Ratio of Oxide Layers Based on D50

Here, when the volume is calculated using D50 assuming that the silicon particles 33 are spherical and, the ratio of the volume of the oxide layers 33B to the total volume of the silicon particles 33 is defined as a volume ratio of the oxide layers 33B based on D50. In this case, the volume ratio of the oxide layers 33B based on D50 is preferably 0.4% or less, more preferably 0.3% or less, and still more preferably 0.25% or less. When the volume ratio is within this range, the amount of oxide in the vicinity of the surface is reduced, and the capacity of the negative electrode material can be improved. Furthermore, the volume ratio of the oxide layer 33B based on D50 is preferably 0.13% or more, more preferably 0.05% or more, and still more preferably 0.01% or more. When the volume ratio is within this range, preparation of excessive facilities or processes for preventing oxidation of the silicon particle are not required and the decrease in productivity can be suppressed while improving the capacity of the negative electrode material.

The volume ratio of the oxide layers 33B based on D50 can be calculated as follows. In other words, assuming that the silicon particles 33 are spherical (true sphere), the volume of the silicon particles 33 is calculated using D50 as the diameter of the silicon particles 33. Then, the diameters of the Si layers 33A are calculated by subtracting the thicknesses of the oxide layers 33B calculated as described above from D50, and assuming that the Si layers 33A are spherical (true sphere), the volume of the Si layers 33A is calculated using the diameters of the Si layers 33A. A value obtained by subtracting the volume of the Si layers 33A from the volume of the silicon particles 33 calculated in this manner is defined as the volume of the oxide layers 33B. The ratio of the volume of the oxide layers 33B to the volume of the silicon particles 33 is defined as the volume ratio of the oxide layers 33B based on D50.

Positive Electrode

The positive electrode 16 illustrated in FIG. 1 includes a current collecting layer and a positive electrode material layer. The current collecting layer of the positive electrode 16 is a layer formed of a conductive member, and an example of the conductive member here includes aluminum. The positive electrode material layer is a layer formed of a positive electrode material, and is provided on a surface of the current collecting layer of the positive electrode 16. The current collecting layer of the positive electrode preferably has a thickness of, for example, approximately 10 μm or more and 30 μm or less, and the positive electrode material layer has a thickness of, for example, approximately 10 μm or more and 100 μm or less.

The positive electrode material layer includes a positive electrode material. The positive electrode material includes particles of lithium compound being a compound containing lithium. The lithium compound is preferably a lithium-containing metal oxide, a lithium-containing phosphate, or the like. More specifically, examples of the lithium compound include $LiCoO_2$, $LiNiO_2$, $LiMnO_2$, $LiMn_2O_4$, $LiNi_aCo_bMn_cO_2$ (where $0<a<1$, $0<b<1$, $0<c<1$, and $a+b+c=1$), $LiFePO_4$, and the like. The lithium compound may contain only one kind of material or two or more kinds of materials. In addition, the positive electrode material layer may contain a substance other than the positive electrode material, and may contain, for example, a binder. The binder may use any material, such as polyvinylidene fluoride (PVDF), polytetrafluoroethylene (PTFE), and PAA. Only one kind of binder may be used or two or more kinds of binders may be used in combination.

Separator

The separator 18 illustrated in FIG. 1 is an insulating member. In the present embodiment, the separator 18 is, for example, a porous film made of a resin, and the resin includes polyethylene (PE), polypropylene (PP), and the like. Furthermore, the separator 18 may have a structure in which films of different materials are stacked. In addition, the separator 18 may have a heat resistant layer. The heat resistant layer is a layer containing a substance having a high melting point. The heat resistant layer may contain, for example, particles formed of an inorganic material such as alumina.

Electrolyte

The electrolyte provided in the battery 1 is a non-aqueous electrolyte. A void in the electrode group 12 is impregnated with the electrolyte. The electrolyte includes, for example, a lithium salt and an aprotic solvent. The lithium salt is dispersed and dissolved in the aprotic solvent. Examples of the lithium salt include $LiPF_6$, $LiBF_4$, $Li[N(FSO_2)_2]$, $Li[N(CF_3SO_2)_2]$, $Li[B(C_2O_4)_2]$, $LiPO_2F_2$, and the like. The aprotic solvent may be, for example, a mixture of a cyclic carbonate ester and a chain carbonate ester. Examples of the cyclic carbonate ester include EC, PC, butylene carbonate, and the like. Examples of the chain carbonate ester include a dimethyl carbonate (DMC), an ethyl methyl carbonate (EMC), and a diethyl carbonate (DEC).

Manufacturing Method for Battery

Next, an example of a manufacturing method for the battery 1 according to the present embodiment will be described. The present manufacturing method includes a step of preparing a silicon raw material in an atmosphere having an oxygen concentration of 5% or less, a step of manufacturing the negative electrode material by providing tungsten trioxide and the silicon material on the surface of carbon by using the silicon raw material, and a step of manufacturing the positive electrode material.

Step of Preparing Silicon Raw Material

Figure 8:
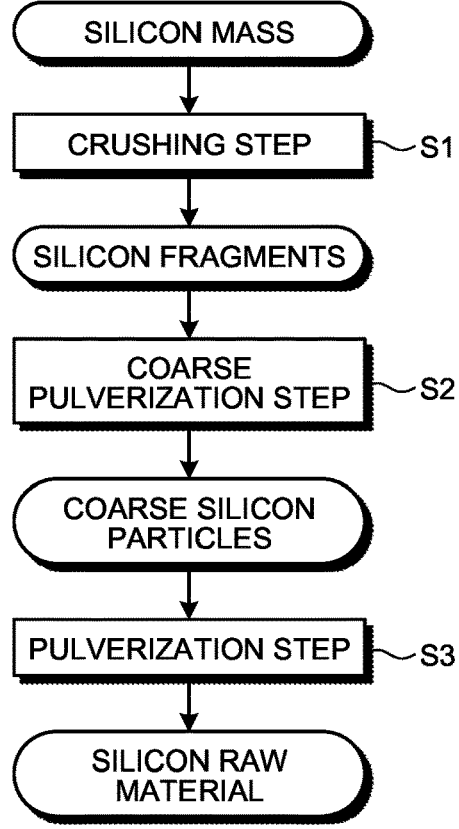
FIG. 8 is a flowchart illustrating the steps of preparing a silicon raw material.

FIG. 8 is a flowchart illustrating the steps of preparing the silicon raw material. The silicon raw material is a raw material of the silicon particles 33. As illustrated in FIG. 8, the steps of preparing the silicon raw material includes a crushing step S1, a coarse pulverization step S2, and a pulverization step S3.

In the steps of preparing the silicon raw material, it is preferable to prepare the silicon raw material by pulverizing a silicon base material in an atmosphere having an oxygen concentration of 5% or less, and the oxygen concentration is more preferably 3% or less, more preferably 1% or less, and still more preferably 0.1% or less. Such low oxygen concentration suppresses oxidation of a new surface of silicon appearing after crushing and increase in the thickness of an oxide layer formed on a surface before crushing, and decrease in capacity can be suppressed. Note that the oxygen concentration can be measured by an oxygen monitor OM-25MF01 manufactured by Taiei Engineering Co., Ltd., and when the oxygen concentration is lower than 1%, the oxygen concentration can be measured by a low concentration oxygen monitor JKO-O2LJD3 manufactured by ICHI-NEN JIKCO Ltd. In addition, in the coarse pulverization step S2 and the pulverization step S3, the oxygen concentration is preferably set within the range described above, and in all the steps of the crushing step S1, the coarse pulverization step S2, and the pulverization step S3, the oxygen concentration is more preferably set within the range described above.

Crushing Step

The crushing step S1 is a step of crushing a silicon mass to obtain silicon fragments. The size of the silicon mass is not particularly limited. The shape of the silicon mass is not particularly limited, and may be, for example, a columnar shape, a plate shape, or a granular shape. For the silicon mass, a silicon chunk, polycrystalline silicon other than the chunk, a lump of single crystal silicon and columnar crystal silicon ingot, a monitor silicon wafer, a dummy silicon wafer, and granular silicon can be used.

A crusher for crushing the silicon mass is not particularly limited, and for example, a hammer crusher, jaw crusher, a gyratory crusher, a cone crusher, a roll crusher, and an impact crusher can be used. The size of the silicon fragments obtained by crushing the silicon mass is preferably within a range where the longest diameter is more than 1 mm and 5 mm or less.

Coarse Pulverization Step

The coarse pulverization step S2 is a step of coarsely pulverizing the silicon fragments to obtain coarse silicon particles. The coarse silicon particles obtained in the coarse pulverization step S2 preferably have a maximum particle diameter sorted out by a sieve method of 1000 μm or less. Therefore, the coarse pulverization step S2 preferably includes a step of sorting out a coarse pulverized material obtained by coarse pulverization with a sieve having a mesh size of 1000 μm to collect coarse particles having a maximum particle diameter of 1000 μm or less. If the coarse silicon particles have a size exceeding 1000 μm, there may be a risk that coarse silicon particles not sufficiently pulverized in the next pulverization step S3 are mixed. In particular, the coarse silicon particles preferably have a maximum particle diameter of 500 μm or less.

Coarse pulverization may be performed by either a dry method or a wet method but is preferably performed by the dry method. A pulverizer for coarsely pulverizing the silicon fragments is not particularly limited, and, for example, a ball mill (planetary ball mill, vibration ball mill, rolling ball mill, and stirring ball mill), a jet mill, or a three-dimensional ball mill can be used.

Pulverization Step

The pulverization step S3 is a step of pulverizing the coarse silicon particles to obtain the silicon raw material (fine silicon particles). In the pulverization step S3, for example, a ball mill (planetary ball mill, vibration ball mill, rolling ball mill, and stirring ball mill), a jet mill, or a three-dimensional ball mill can be used. It is preferable to use the three-dimensional ball mill of Nagao System Inc., as a pulverizer.

For a hard ball, a zirconia ($ZrO_2$) ball or alumina ball ($Al_2O_3$) can be used. The hard ball preferably has a particle diameter within a range of 0.1 mm or more and 20 mm or less. When the particle diameter of the hard ball is within this range, the coarse silicon particles can be efficiently pulverized. An amount of the hard balls used is preferably within a range of 500 pts·mass or more and 2500 pts·mass or less as an amount with respect to 100 pts·mass of the coarse silicon particles. When the amount of the hard balls used is within this range, the coarse silicon particles can be efficiently pulverized. The amount of the hard balls used is more preferably within a range of 1000 pts·mass or more and 2000 pts·mass or less, and particularly preferably within a range of 1100 pts·mass or more and 1500 pts·mass or less.

A filling rate of the coarse silicon particles and the hard balls in a container of the three-dimensional ball mill is preferably within a range of 3% or more and 35% or less as a total volume amount of the coarse silicon particles and the hard balls to the capacity of the container. If the filling rate is reduced too much, the pulverization efficiency may be reduced and the production cost may be increased. On the other hand, when the filling rate is increased too much, performance of pulverization is made difficult, the average particle diameter of the silicon raw material to be obtained may increase or the coarse silicon particles insufficiently pulverized may remain. The filling rate of the coarse silicon particles and the hard balls is more preferably within a range of 15% or more and 30% or less, and particularly preferably within a range of 20% or more and 30% or less. Note that the filling rate is a volume assuming that the inside of the container filled with the raw material and the hard balls without any gap is 100%. For example, the filling rate is 50% when a half of the container of spherical shape is filled with the raw material and the hard balls without any gap, and the filling rate is 15.6% when the container of hemispherical shape (one of two half containers forming the container) is filled with the raw material and the hard balls without any gap to ½ height of the container. However, the wording "without any gap" used herein means a macroscopic gap, and means a state in which a plurality of balls are removed, not meaning a gap formed between the balls.

The container is preferably filled with a non-oxidizing gas. Use of the container filled with the non-oxidizing gas makes it possible to suppress aggregation of particles due to moisture absorption of the fine silicon particles and oxidation of the fine silicon particles. For the non-oxidizing gas, argon, nitrogen, and carbon dioxide can be used.

In a production method for the silicon raw material of the present embodiment, the coarse silicon particles having a maximum particle diameter measured by the sieve method of 1000 μm or less are prepared in the coarse pulverization step S2, and the coarse silicon particles are pulverized under predetermined conditions by using the three-dimensional ball mill in the next pulverization step S3. Therefore, it is possible to industrially advantageously produce a fine silicon raw material which is fine, hardly forms coarse aggregated particles, and has high dispersibility in mixing with other raw material particles.

Although the production method for the silicon raw material has been described above, the production method is not limited to the above and may use any appropriate method.

Step of Producing Negative Electrode Material and Positive Electrode Material

Figure 9:
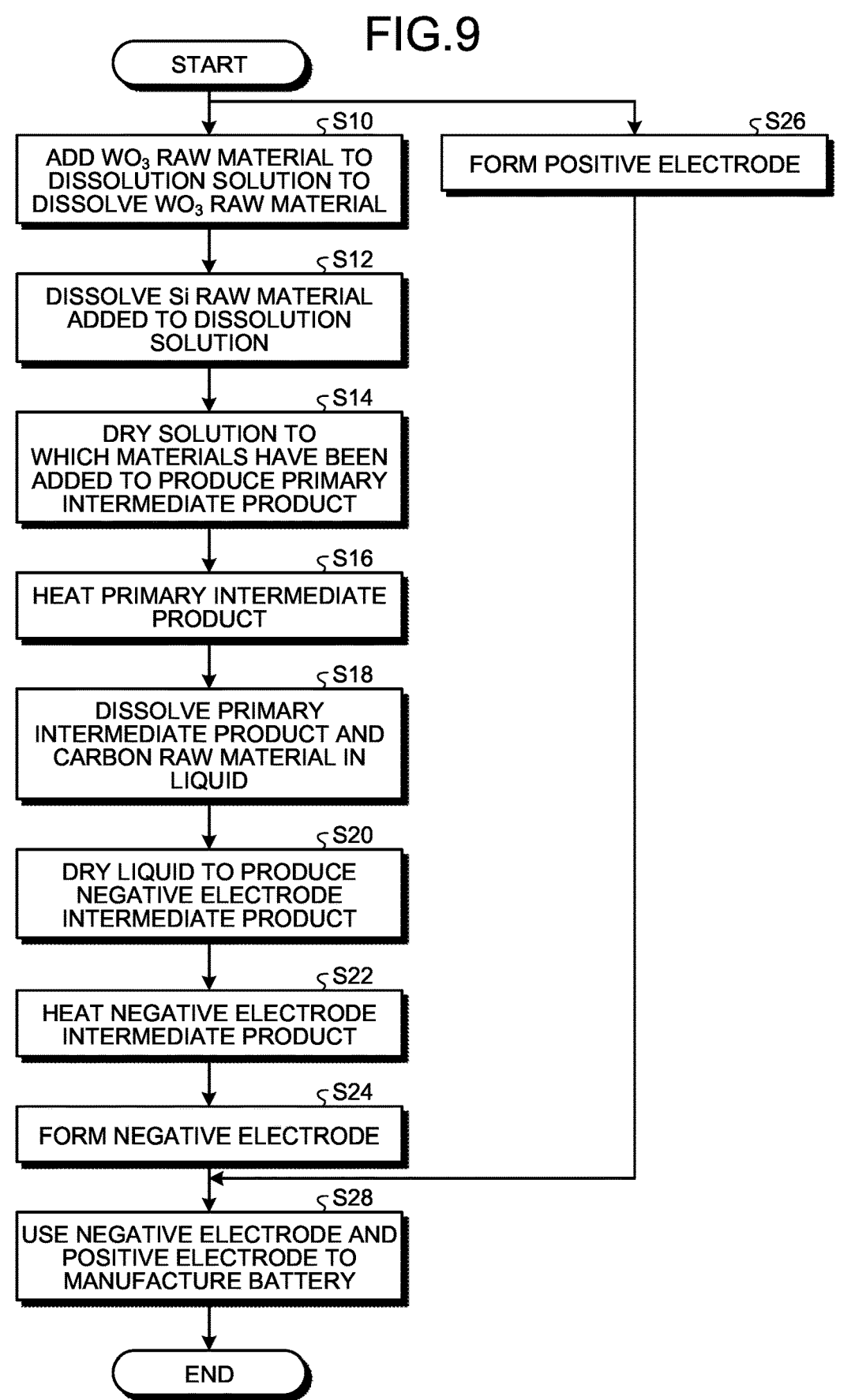
FIG. 9 is a flowchart illustrating an example of a manufacturing method for the battery according to the present embodiment.

FIG. 9 is a flowchart illustrating an example of a manufacturing method for the battery according to the present embodiment. As illustrated in FIG. 9, in the present manufacturing method, the negative electrode 14 is formed in Steps S10 to S28.

Specifically, a $WO_3$ raw material is added to a dissolution solution to dissolve the $WO_3$ raw material in the dissolution solution (Step S10; dissolution step). The $WO_3$ raw material is tungsten trioxide used as a raw material of the negative electrode material. The dissolution solution is a solution in which the $WO_3$ raw material, that is, tungsten trioxide can be dissolved. For the dissolution solution, for example, an alkaline solution is used, and in the present embodiment, an aqueous ammonia solution is used. In the dissolution solution, the concentration of ammonia to the entire dissolution solution is preferably 5 wt % or more and 30 wt % or less.

In the present embodiment, dissolution is not limited to a state in which all of the raw material has been dissolved, and also includes a state in which part of the raw material remains. In addition, dissolution includes mixing and dissolving row materials.

The $WO_3$ raw material is produced by, for example, dissolving $CaWO_4$ having been reacted with hydrochloric acid, with ammonia, and burning crystallized ammonium paratungstate, but may be produced by any method. Note that $WO_3$ is tungsten trioxide, tungsten oxide (VI), or tungstic anhydride.

In Step S10, a ratio of the amount of the $WO_3$ raw material added to the amount of ammonia contained in the dissolution solution is preferably 1 mol % or more and 10 mol % or less. The ratio of the amount of the $WO_3$ raw material added of 1 mol % or more can provide a sufficient amount of tungsten trioxide in the dissolution solution, and the ratio of the amount of the $WO_3$ raw material added of 10 mol % or less can suppress the amount of tungsten trioxide remaining undissolved. In Step S10, the $WO_3$ raw material is added to the dissolution solution and stirred for a predetermined time period to dissolve the $WO_3$ raw material in the dissolution solution. The predetermined time period here is preferably 6 hours or more and 24 hours or less. The predetermined time period set to 6 hours or more allows appropriate dissolution of the $WO_3$ raw material in the dissolution solution, and the predetermined time period set to 24 hours or less suppresses too long production time. Step S10 may be a preparation step of preparing the dissolution solution in which the $WO_3$ raw material has been dissolved in advance, before Step S12 which is described later.

Next, the silicon raw material is added to and dissolved in the dissolution solution (here, ammonium tungstate solution) in which the $WO_3$ raw material has been dissolved (Step S12; addition step).

In Step S12, the dissolution solution in which the $WO_3$ raw material has been dissolved is stirred to disperse the silicon raw material in the dissolution solution. Furthermore, in Step S12, in order to improve affinity between the silicon raw material and $WO_3$, a surfactant may be added to the dissolution solution in which the silicon raw material and $WO_3$ have been dispersed. As the surfactant, sodium dodecyl sulfate (SDS) may be used, or a surfactant without containing Na may be used.

As the surfactant without containing Na, for example, a poly(oxyethylene) alkyl ether, a polyoxyethylene nonylphenyl ether, or the like may be used. As the poly(oxyethylene) alkyl ether, for example, $C_{12}H_{25}O(C_2H_4)_nH$ (poly(oxyethylene) dodecyl ether), $C_{13}H_{27}O(C_2H_4)_nH$ (poly(oxyethylene) tridecyl ether), $C_{13}H_{27}O(C_2H_4)_nH$ (poly(oxyethylene) isotridecyl ether), $C_{14}H_{25}O(C_2H_4)_nH$ (poly(oxyethylene) tetradecyl ether), $C_{15}H_{25}O(C_2H_4)_nH$ (poly(oxyethylene) pentadecyl ether), or the like having an alkyl group with 12 or more and 15 or less carbon atoms may be preferably used. Here, n is an integer of 1 or more. As the polyoxyethylene nonylphenyl ether, for example, $C_9H_{19}C_6$ $(CH_2CH_2O)_8H$, $C_9H_{19}C_6(CH_2CH_2O)_{10}H$, $C_9H_{19}C_6$ $(CH_2CH_2O)_{12}H$, or the like may be used.

The amount of the surfactant added is preferably 2 wt % or more and 8 wt % or less to the amount of the $WO_3$ raw material added to the dissolution solution. The amount within this numerical range appropriately improves the affinity between the silicon raw material and $WO_3$.

Next, a liquid component of the dissolution solution is removed to produce a primary intermediate material (primary intermediate material producing step). In the present embodiment, Steps S14 and S16 are executed as the primary intermediate material producing step. Specifically, the dissolution solution is dried to produce a primary intermediate product (Step S14; drying step). In Step S14, the dissolution solution is dried at 80° C. for 12 hours in air or in an inert gas atmosphere to remove, that is, evaporate the liquid component contained in the dissolution solution. Use of the inert gas suppress oxidation of Si. It can be said that the primary intermediate product contains a solid component remaining after removal of the liquid component of the dissolution solution.

Next, the dried primary intermediate product is subjected to heat treatment to produce the primary intermediate material (Step S16; heating step). By heating the primary intermediate product, the primary intermediate material in which the $WO_3$ particles 32 are provided on the surfaces of the silicon particles 33 is formed. A temperature at which the primary intermediate product is heated is preferably 500° C. or more and 900° C. or less in the inert gas atmosphere. Setting the temperature at which the primary intermediate product is heated within this range, the primary intermediate material can be appropriately formed. Furthermore, a time period during which the primary intermediate product is heated is preferably 1 hour or more and 10 hours or less. Setting the time period during which the primary intermediate product is heated within this range, the primary intermediate material can be appropriately formed. Note that Steps S12 to S16 may be a preparation step to prepare the primary intermediate material described above (or primary intermediate product) in advance prior to Step S18 which is described later.

Next, the primary intermediate product and a carbon raw material (here, hard carbon) are mixed and dispersed in a liquid (here, water) (Step S18; addition step). The carbon raw material is hard carbon used as a raw material.

The carbon raw material may be produced, for example, by an oil-furnace method. In the oil-furnace method, for example, a raw material oil is sprayed into a high-temperature atmosphere to be thermally decomposed, and then rapidly cooled to produce a particulate carbon raw material. However, a production method for the carbon raw material is not limited thereto, and may use any appropriate method.

Here, when the $WO_3$ raw material, the silicon raw material, and the carbon raw material are added to the dissolution solution, a ratio of the amount of the silicon raw material added, to a total amount of the amount of the $WO_3$ raw material added, the amount of the silicon raw material added, and the amount of the carbon raw material added is defined as a silicon raw material additive ratio, and the ratio of the amount of the $WO_3$ raw material added is defined as a $WO_3$ raw material additive ratio. In the present production method, the silicon raw material additive ratio is set to 1 wt % or more and 10 wt % or less, preferably 2 wt % or more and 8 wt % or less, and more preferably 5 wt % or more and 8 wt % or less. Setting the silicon raw material additive ratio within this range, the silicon particles 33 are appropriately formed on the surfaces of the carbon particles 30, increasing the capacity of the battery, as the negative electrode. In the present production method, the $WO_3$ raw material additive ratio is set to 1 wt % or more and 10 wt % or less, preferably 2 wt % or more and 8 wt % or less, and more preferably 5 wt % or more and 8 wt % or less. Setting the $WO_3$ raw material additive ratio within this range, the $WO_3$ particles 32 are appropriately formed on the surfaces of the carbon particles 30, increasing the capacity of the battery, as the negative electrode.

In Step S18, the liquid (here, water) is stirred to disperse the primary intermediate material and the carbon raw material in the liquid. Furthermore, in Step S18, in order to improve affinity between the carbon raw material, silicon, and $WO_3$, a surfactant may be added to the liquid. As the surfactant, sodium dodecyl sulfate (SDS) may be used, or a surfactant without containing Na may be used. The amount of the surfactant added is preferably 2 wt % or more and 8 wt % or less, to the amount of the carbon raw material added to the liquid. The amount within this numerical range appropriately improves the affinity between the carbon raw material, silicon, and $WO_3$.

Next, a liquid component of the solution in which the primary intermediate material and the carbon raw material are dispersed in the liquid is removed to produce the negative electrode material (negative electrode material producing step). In the present embodiment, Steps S20 and S22 are executed as the negative electrode material producing step. Specifically, the solution is dried to produce a negative electrode intermediate product (Step S20; drying step). In Step S20, the solution is dried at 80° C. for 12 hours in air or in an inert gas atmosphere to remove, that is, evaporate the liquid component contained in the solution. It can be said that the negative electrode intermediate product contains a solid component remaining after removal of the liquid component of the solution.

Next, the negative electrode intermediate product is heated to produce the negative electrode material (Step S22; heating step). By heating the negative electrode intermediate product, the negative electrode material in which the $WO_3$ particles 32 and the silicon particles 33 are provided on the surfaces of the carbon particles 30 is formed. A temperature at which the negative electrode intermediate product is heated is preferably 500° C. or more and 900° C. or less in the inert gas. Setting the temperature at which the negative electrode intermediate product is heated within this range, the negative electrode material can be appropriately formed. Furthermore, a time period during which the negative electrode intermediate product is heated is preferably 1 hour or more and 10 hours or less. Setting the time period during which the negative electrode intermediate product is heated within this range, the negative electrode material can be appropriately formed.

Next, the formed negative electrode material is used to form the negative electrode 14 (Step S24). In other words, the negative electrode material layer 22 containing the negative electrode material is formed on the surface of the current collecting layer 20 to form the negative electrode 14.

Furthermore, in the present manufacturing method, the positive electrode 16 is formed (Step S26). In Step S26, the positive electrode material is formed in the same manner as in Steps S10 to S24 except that a lithium compound raw material which is the lithium compound is used instead of the carbon raw material. Then, the positive electrode material layer containing the positive electrode material is formed on the surface of the current collecting layer for the positive electrode 16 to form the positive electrode 16.

After the negative electrode 14 and the positive electrode 16 are formed, the negative electrode 14 and the positive electrode 16 are used to manufacture the battery 1 (Step S28). Specifically, the negative electrode 14, the separator 18, and the positive electrode 16 are stacked to form the electrode group 12, the electrode group 12 and the electrolyte are housed in the casing 10, and the battery 1 is manufactured.

As described above, in the present embodiment, as shown in Steps S10 to S24, after silicon is added to the dissolution solution in which tungsten trioxide has been dissolved, the liquid component is removed to produce the primary intermediate material, then the liquid component is removed after the primary intermediate material and hard carbon are added to the liquid, and the negative electrode material is produced. Hereinafter, the production method for the negative electrode material as described above is appropriately referred to as a solution method. In addition, the above manufacturing method using SDS as the surfactant is referred to as a first production method.

In Step S18, in order to improve the affinity between the carbon raw material, silicon, and $WO_3$, the surfactant may be added to the solution. As the surfactant, a surfactant without containing Na may be used. As shown in Steps S10 to S24, after silicon is added to the dissolution solution in which tungsten trioxide has been dissolved, the liquid component is removed to produce the primary intermediate material, and then the liquid component is removed after the primary intermediate material and the hard carbon are added to the liquid, and the negative electrode material is produced, with the use of the surfactant without containing Na. Hereinafter, the production method for the negative electrode material as described above is appropriately referred to as the solution method. The above manufacturing method is referred to as a second manufacturing method.

Modification of Manufacturing Method for Battery

Figure 10:
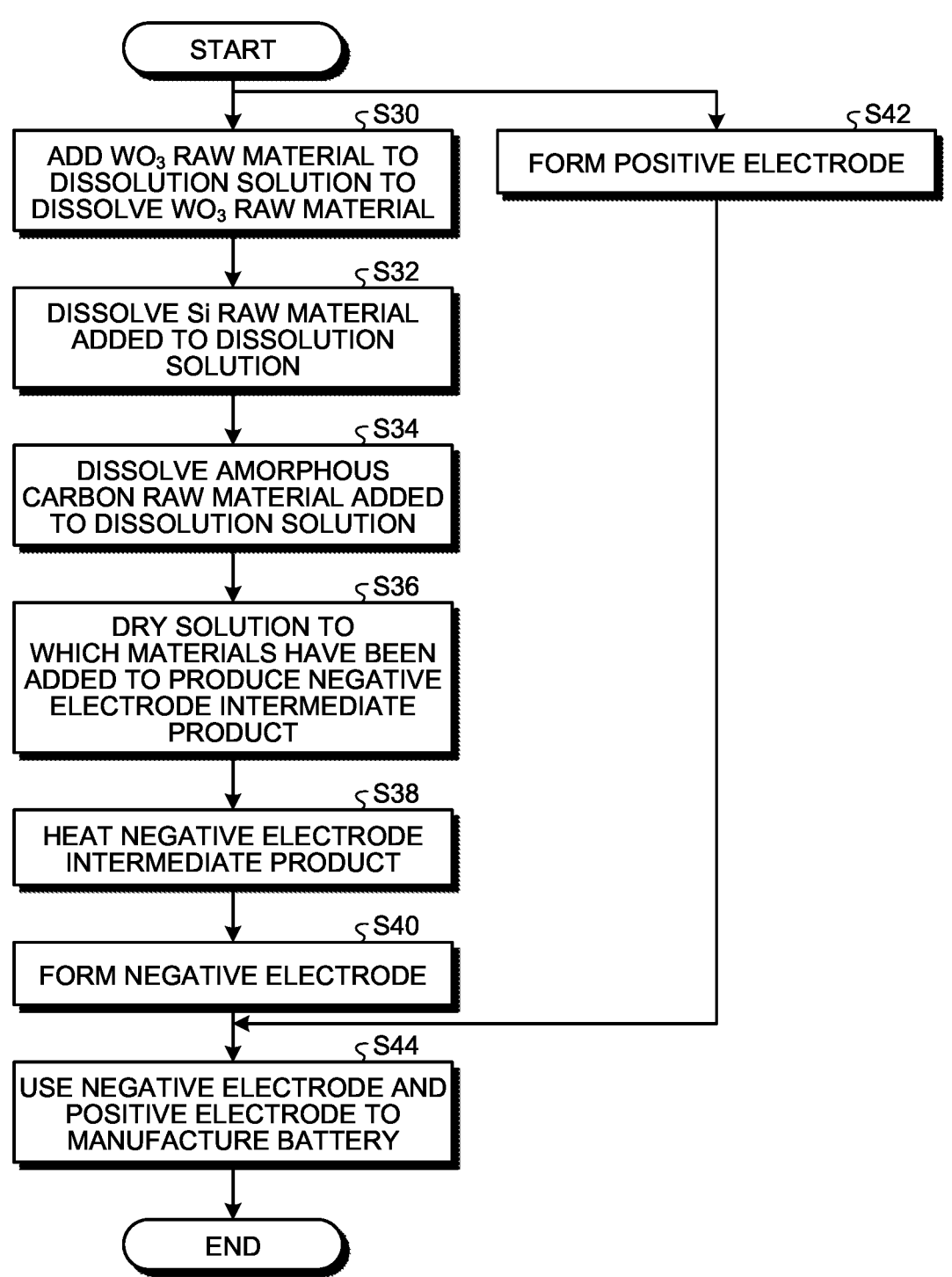
FIG. 10 is a flowchart illustrating an example of a manufacturing method for the battery according to the present embodiment.

Next, another example of the manufacturing method for the battery 1 according to the present embodiment will be described. FIG. 10 is a flowchart illustrating an example of the manufacturing method for the battery according to the present embodiment. As illustrated in FIG. 10, in the present manufacturing method, the negative electrode 14 is formed in Steps S30 to S44. In Steps S30, S32, S40, S42, and S44, processing similar to those in Steps S10, S12, S24, S26, and S28 is performed.

Next, the carbon raw material is added to and dissolved in the dissolution solution in which the $WO_3$ raw material and the silicon raw material have been dissolved (Step S34; addition step). The carbon raw material is hard carbon used as a raw material.

In Step S34, the dissolution solution is stirred, and the $WO_3$ raw material, the silicon raw material, and the carbon raw material are mixed and dispersed in the solution. In Step S34, in order to improve the affinity between the carbon raw material, silicon, and $WO_3$, the surfactant may be added to the solution.

Next, a liquid component of the dissolution solution is removed to generate the negative electrode material (negative electrode material producing step). In the present embodiment, Steps S36 and S38 are executed as the negative electrode material producing step. Specifically, the dissolution solution is dried to produce the negative electrode intermediate product (Step S36; drying step). In Step S36, the dissolution solution is dried at 80° C. for 12 hours in air or in an inert gas atmosphere to remove, that is, evaporate the liquid component contained in the dissolution solution. It can be said that the negative electrode intermediate product contains a solid component remaining after removal of the liquid component of the dissolution solution.

Next, the negative electrode intermediate product is heated to produce the negative electrode material (Step S38; heating step). By heating the negative electrode intermediate product, the negative electrode material in which the $WO_3$ particles 32 and the silicon particles 33 are provided on the surfaces of the carbon particles 30 is formed. A temperature at which the negative electrode intermediate product is heated is preferably 500° C. or more and 900° C. or less in the inert gas. Setting the temperature at which the negative electrode intermediate product is heated within this range, the negative electrode material can be appropriately formed. Furthermore, a time period during which the negative electrode intermediate product is heated is preferably 1 hour or more and 10 hours or less. Setting the time period during which the negative electrode intermediate product is heated within this range, the negative electrode material can be appropriately formed.

As described above, in the present embodiment, as shown in Steps S30 to S44, after silicon and hard carbon are added to the dissolution solution in which tungsten trioxide has been dissolved, the liquid component is removed, and the negative electrode material is manufactured. Hereinafter, the production method for the negative electrode material as described above is also appropriately referred to as the solution method. The above manufacturing method is referred to as a third manufacturing method.

Although the manufacturing methods for the negative electrode material and the positive electrode material have been described above, the production methods are not limited to the above and may use any appropriate method.

Effects

As described above, the negative electrode material according to the present embodiment is a negative electrode material for a battery, and includes the silicon particles 33 containing carbon, tungsten trioxide, and silicon. In the silicon particles 33, the ratio of the amount of Si in Si2p derived from elemental silicon to the amount of Si in Si2p derived from $SiO_2$ in the surface layer is 3 or more, on the atomic concentration basis, as measured by the X-ray photoelectron spectroscopy.

Here, when tungsten trioxide or Si is provided in the negative electrode material, the battery performance can be improved. However, further improvement in performance is required, and as a result of intensive studies, the present inventors found that a Si oxide suppresses improvement in capacity. Meanwhile, in the negative electrode material according to the present embodiment, the ratio of the amount of Si in Si2p derived from elemental silicon to the amount of Si in Si2p derived from $SiO_2$ in the surface layer is 3 or more, on the atomic concentration basis. Therefore, according to the present embodiment, the silicon oxide can be reduced, and the battery performance can be improved.

Furthermore, in the silicon particles 33, the ratio of the amount of Si in Si2p to the amount of O in O1s in the surface layers is preferably 1.2 or more, on the atomic concentration basis, as measured by the X-ray photoelectron spectroscopy. In the negative electrode material according to the present embodiment, when the ratio of the amount of Si in Si2p to the amount of O in O1s, in the silicon particles 33, is within this range, the amount of oxide in the vicinity of the surface is reduced, and the battery performance can be improved. In particular, silicon oxides (e.g., SiO etc.) other than $SiO_2$ may also act as a factor suppressing the improvement of the capacity. In such a case, when the ratio of the amount of Si in Si2p to the amount of O in O1s is within the above range, the amount of the silicon oxides other than $SiO_2$ can be reduced, and the battery performance can be appropriately improved.

Furthermore, the silicon particles 33 each include the Si layer 33A including Si and the oxide layer 33B formed over the surface of the Si layer 33A and including a silicon oxide, and when the volume of the silicon particles 33 is calculated using the volume average particle diameter, assuming that the silicon particles 33 are spherical, the volume of the oxide layers 33B to the total volume of the silicon particles 33 is preferably 0.05% or less. When the volume ratio of the oxide layers 33B is within this range, the amount of oxide in the vicinity of the surface is reduced, and the battery performance can be improved.

Furthermore, the silicon particles 33 each include the Si layer 33A including Si and the oxide layer 33B formed over the surface of the Si layer 33A and including a silicon oxide, and when the volume of the silicon particles 33 is calculated using the particle diameter D50 at a cumulative frequency of 50 vol % in the volume-based particle size distribution measured by the laser diffraction method, assuming that the silicon particles 33 are spherical, the volume of the oxide layers 33B to the total volume of the silicon particles 33 is preferably 0.4% or less. When the volume ratio of the oxide layers 33B is within this range, the amount of oxide in the vicinity of the surface is reduced, and the battery performance can be improved.

Furthermore, in the negative electrode material, when the total content of carbon, tungsten trioxide, and the silicon particles 33 is 100 wt %, the content of the silicon particles 33 is preferably 1 wt % or more and 10 wt % or less. Setting the content of the silicon particles 33 within this range, the performance of the battery can be improved.

The production method for the negative electrode material according to the present embodiment includes the step of preparing the silicon raw material in an atmosphere having an oxygen concentration of 5% or less, and the step of producing the negative electrode material containing carbon, tungsten trioxide, and the silicon particles 33 by using the silicon raw material, in which in the silicon particles 33, the ratio of the amount of Si in Si2p of elemental silicon to Si in Si2p derived from $SiO_2$ in the surface layer is preferably 3 or more, on the atomic concentration basis, as measured by the X-ray photoelectron spectroscopy. Preparing the silicon raw material at such a low oxygen concentration, oxidation of silicon can be suppressed, and the battery performance can be improved.

EXAMPLES

Next, examples will be described.

First Example

Preparation of Silicon Raw Material

A flake-like polycrystalline silicon chunk (purity: 99.999999999 mass %, length: 5 to 15 mm, width: 5 to 15 mm, thickness: 2 to 10 mm) were crushed using a hammer mill. Next, the obtained pulverized material was subjected to dry classification with a sieve having a mesh size of 5 mm to obtain silicon fragments of undersize.

The obtained silicon fragments, hard balls (zirconia ball, diameter: 10 mm), and a container that can be divided into one container and the other container were housed in a glove box filled with Ar gas. In the glove box, 30 pts·mass of silicon fragments and 380 pts·mass of hard balls were put into one of the containers. Next, the one container into which the silicon fragments and the hard balls were put and the other container were combined, and the two containers were fastened with screws and sealed in the glove box filled with Ar gas. Mating surfaces of the two containers are each formed into a sliding surface so as to maintain airtightness. The filling rate of the silicon fragments and the hard balls in the container was set to 28%.

The container filled with the silicon fragments and the hard balls was taken out from the glove box and set into a three-dimensional ball mill apparatus. Then, coarse pulverization was performed under the conditions of a rotation speed of a first rotation shaft: 300 rpm, a rotation speed of a second rotation shaft: 300 rpm, and a pulverization duration: 0.33 hours. The coarse pulverized silicon after the coarse pulverization and the hard balls were subjected to dry classification with a sieve having a mesh size of 1000 μm to obtain coarse silicon particles having a maximum particle diameter of 1000 μm or less.

The obtained coarse silicon particles, the hard balls (zirconia ball, diameter: 10 mm), and a hemispherical container were housed in a glove box filled with Ar gas. Next, in the glove box, 15 pts·mass of silicon fragments and 200 pts·mass of hard balls were put into one of the hemispherical containers (the amount of the hard balls to 100 pts·mass of the coarse silicon particles was 1333 pts·mass). Next, one hemispherical container in which the silicon fragments and the hard balls have been input was combined with the other hemispherical container so as to form a spherical container, and the two containers were fastened with screws and sealed in the glove box filled with Ar gas. The filling rate of the silicon fragments and the hard balls in the container was 15%.

The container filled with the coarse silicon particles and the hard balls was taken out from the glove box and set into the three-dimensional ball mill apparatus. Then, pulverization was performed under the conditions of the rotation speed of the first rotation shaft: 300 rpm, the rotation speed of the second rotation shaft: 300 rpm, and the pulverization duration: 3 hours to obtain the silicon raw material.

Preparation of Negative Electrode Material

In a first example, hard carbon, tungsten trioxide, and silicon were used to produce the negative electrode material by the first manufacturing method using the solution method described in the embodiment. Specifically, 5 ml of ammonia solution having a concentration of 28 wt % and 0.05 g of $WO_3$ raw material were added in a 50 ml beaker, and the mixture was stirred at 40° C. for 12 hours to dissolve the $WO_3$ raw material in the ammonia solution. Furthermore, 0.05 g of SDS was added to this ammonia solution so that the weight ratio of the SDS to the $WO_3$ raw material was 1:1, and the mixture was stirred at room temperature for 4 hours to dissolve the SDS in the ammonia solution. Then, 0.05 g of silicon raw material was added to this ammonia solution so that the weight ratio of the silicon raw material to the $WO_3$ raw material was 1:1, and the mixture was stirred at room temperature for 4 hours to dissolve the silicon raw material in the ammonia solution. Then, the ammonia solution after stirring was heated at 80° C. for 12 hours and dried to produce the primary intermediate material. Then, this primary intermediate material was introduced into a tubular furnace, left to stand at room temperature for 2 hours in a nitrogen atmosphere, and then, continuously heated to 200° C. at a heating speed of 3° C./min, to 550° C. at a heating speed of 1° C./min, and to 700° C. at a heating speed of 3° C./min, for 2 hours, with the nitrogen atmosphere maintained, and the primary intermediate material was produced. Then, the produced primary intermediate material, 5 ml of pure water, 0.053 g of SDS, and 0.95 g of carbon raw material were added in order. Then, this liquid was stirred for 4 hours until the carbon raw material was dispersed in the pure water, and then heated at 80° C. for 12 hours and dried to produce the negative electrode intermediate product. Then, this negative electrode intermediate product was introduced into a tubular furnace, left to stand at room temperature for 2 hours in a nitrogen atmosphere, and then, continuously heated to 200° C. at a heating speed of 3° C./min, to 550° C. at a heating speed of 1° C./min, and to 700° C. at a heating speed of 3° C./min, for 2 hours, with the nitrogen atmosphere maintained, and the negative electrode material was produced.

In the first example, the ratio of the silicon raw material, that is, the amount of the silicon raw material added with respect to a total value of the amount of the carbon raw material added, the amount of the $WO_3$ raw material added, and the amount of the silicon raw material added was set to 5 wt %. In the first example, the amount of the $WO_3$ raw material added was 0.05 g, the amount of the silicon raw material added was 0.05 g, and the amount of the carbon raw material added was 0.95 g.

Second Example

In a second example, the negative electrode material was produced by the same method as in the first example except that the final pulverization duration in obtaining the silicon raw material was set to 6 hours.

Third Example

In a third example, the negative electrode material was produced by the second manufacturing method by using poly(oxyethylene) alkyl ether ($C_{12}H_{25}O(C_2H_4)_nH$ (poly (oxyethylene) dodecyl ether)), for the surfactant. The amounts of hard carbon, tungsten trioxide, and silicon raw material, and the amount of additive of the surfactant were the same as those in the first example.

Fourth Example

In a fourth example, the negative electrode material was produced by the same method as in the third example except that polyoxyethylene nonylphenyl ether ($C_9H_{19}C_6$ ($CH_2CH_2O)_8H$) was used as the surfactant and the final pulverization duration in obtaining the silicon raw material was set to 6 hours.

First Comparative Example

In a first comparative example, the negative electrode material was produced by the same method as in the first example except that air was filled indoors and the final pulverization duration was set to 1 hour, in obtaining the silicon raw material.

Second Comparative Example

In a second comparative example, the negative electrode material was produced by the same method as in the first example except that air was filled indoors and the final pulverization duration was set to 1.5 hours, in obtaining the silicon raw material.

In the first example to the fourth example, the glove box was filled with argon and the oxygen concentration upon obtaining the silicon raw material was 5% or less. However, in the first and second comparative examples, the glove box is filled with air, and therefore, the oxygen concentration upon obtaining the silicon raw material is higher than 5%.

Characteristics of Silicon Particles

FIG. 11 is a table showing manufacturing conditions, characteristics of silicon particles, and evaluation results of the respective examples. As illustrated in FIG. 11, characteristics based on XPS measurement were measured for the silicon particles of the respective examples. Si concentration in FIG. 11 corresponds to the Si concentration described in the present embodiment, O concentration in FIG. 11 corresponds to the O concentration described in the present embodiment, ratio of Si concentration derived from $SiO_2$ in FIG. 11 corresponds to the ratio of the Si concentration derived from $SiO_2$ described in the present embodiment, Si ratio derived from Si in FIG. 11 corresponds to the Si ratio derived from Si described in the present embodiment, $Si/SiO_2$ in FIG. 11 corresponds to the ratio of the amount of Si in Si2p derived from the elemental silicon to the amount of Si in Si2p derived from $SiO_2$ in the surface layer described in the present embodiment, Si/O in FIG. 11 corresponds to the ratio of the amount of Si in Si2p to the amount of O in O1s in the surface layer described in the present embodiment, and oxide film thickness in FIG. 11 corresponds to the thickness of the oxide layer 33B described in the present embodiment. The X-ray photoelectron spectroscopy in each example uses the apparatuses and conditions described in the present embodiment.

In addition, as illustrated in FIG. 11, the characteristics based on the volume average particle diameter and D50 were measured for the silicon particles of the respective examples. The silicon particles were put into the aqueous surfactant solution, and the fine silicon particles were dispersed by ultrasonic process to prepare a fine silicon particle dispersion liquid. Next, the particle size distribution of the fine silicon particles in the obtained fine silicon particle dispersion liquid was measured using a laser diffraction particle size analyzer (MT3300EX II, manufactured by MicrotracBEL Corp.). From the obtained particle size distribution, the volume average particle diameter and D50 were determined. $SiO_2$ volume in FIG. 11 corresponds to the volume of the oxide layers 33B calculated using the volume average particle diameter (or D50) in the present embodiment, particle volume in FIG. 11 corresponds to the volume of the silicon particles 33 calculated using the volume average particle diameter (or D50) in the present embodiment, and $SiO_2$ volume/particle volume in FIG. 11 corresponds to the volume ratio of the oxide layers 33B based on the volume average particle diameter (or D50) in the present embodiment.

Evaluation Results

As the evaluation of the negative electrode material of each example, the capacity of the negative electrode using the negative electrode material was measured. Specifically, a current value per 1 g (mAh/g) when C-rate was 0.2 and a current value per 1 g (mAh/g) when the C-rate was 3.2 were measured. For example, the current value per 1 g of the negative electrode when the C-rate is 0.2 refers to a current value that consumes a rated capacity in 0.2 hours.

In addition, for the evaluation of the negative electrode material of each example, whether lithium flows into Si of the negative electrode or lithium is released from Si of the negative electrode was also confirmed. When lithium flows into Si of the negative electrode, o was indicated, when lithium does not flow into Si of the negative electrode, x was indicated, when lithium is released from Si of the negative electrode, o was indicated, and when lithium is not released from Si of the negative electrode, x was indicated.

FIG. 11 shows evaluation results. As illustrated in FIG. 11, in the first example and the second example in which $Si/SiO_2$ is 3 or more, the amount of silicon oxide is small, and therefore, the current value at a C-rate of 0.2 is sufficiently maintained, the current value at a C-rate of 3.2 is sufficiently maintained, and lithium flows into Si of the negative electrode and is released from Si of the negative electrode. Therefore, it is found that the battery performance can be improved.

While, in the first and second comparative examples in which $Si/SiO_2$ is less than 3, the amount of silicon oxide is large, the current value at a C-rate of 3.2 is low, and lithium is not released from Si of the negative electrode. Therefore, it is found that the battery performance cannot be appropriately improved.

Although the embodiments of the present invention have been described above, the embodiments are not limited by the contents of the embodiments. In addition, the component elements include components readily conceived by those skilled in the art, and components substantially identical, so-called equivalents. Furthermore, the component elements described above can be appropriately combined. Furthermore, various omissions, substitutions, or modifications of the component elements can be made without departing from the gist of the embodiments described above.

REFERENCE SIGNS LIST

1 Battery
14 Negative electrode
22 Negative electrode material layer
30 Carbon particle
32 $WO_3$ Particle
33 Silicon particle

The invention claimed is:

1. A negative electrode material for a battery, the negative electrode material comprising:
   carbon, tungsten trioxide, and a silicon material including silicon,
   wherein in the silicon material, a ratio of an amount of Si in Si2p derived from elemental silicon to an amount of Si in Si2p derived from $SiO_2$ in a surface layer is 3 or more, on an atomic concentration basis, as measured by X-ray photoelectron spectroscopy.

2. The negative electrode material according to claim 1, wherein in the silicon material, a ratio of an amount of Si in Si2p to an amount of O in O1s in the surface layer is 1.2 or more, on an atomic concentration basis, as measured by the X-ray photoelectron spectroscopy.

3. The negative electrode material according to claim 1, wherein the silicon material includes a Si layer including Si and an oxide layer formed over a surface of the Si layer and including a silicon oxide, and when a volume of the silicon material is calculated using a volume average particle diameter, assuming that the silicon material is spherical, a volume of the oxide layer to a total volume of the silicon material is 0.04% or less.

4. The negative electrode material according to claim 1, wherein the silicon material includes a Si layer including Si and an oxide layer formed over a surface of the Si layer and including Si and O, and when a volume of the silicon material is calculated using a particle diameter D50 at a cumulative frequency of 50 vol % in a volume-based particle size distribution measured by a laser diffraction method, assuming that the silicon material is spherical, a volume of the oxide layer to a total volume of the silicon material is 0.4% or less.

5. The negative electrode material according to claim 1, wherein when a total content of the carbon, the tungsten trioxide, and the silicon material is 100 wt %, a content of the silicon material is 1 wt % or more and 10 wt % or less.

6. A battery comprising:

the negative electrode material according to claim 1; and
a positive electrode material.

7. A production method for a negative electrode material for a battery, the method comprising:

preparing a silicon raw material in an atmosphere having an oxygen concentration of 5% or less; and
producing the negative electrode material including carbon, tungsten trioxide, and a silicon material by using the silicon raw material,
wherein in the silicon material, a ratio of an amount of Si in Si2p derived from elemental silicon to an amount of Si in Si2p derived from SiO$_2$ in a surface layer is 3 or more, on an atomic concentration basis, as measured by X-ray photoelectron spectroscopy.

8. A manufacturing method for a battery comprising:

the production method for a negative electrode material according to claim 7; and
producing a positive electrode material.

* * * * *